United States Patent
Tomita et al.

(10) Patent No.: US 8,485,898 B2
(45) Date of Patent: Jul. 16, 2013

(54) GAME DEVICE, METHOD FOR CONTROLLING GAME DEVICE, PROGRAM, AND INFORMATION STORAGE MEDIUM

(75) Inventors: Hiroyuki Tomita, Saitama (JP); Kazuaki Matsumura, Tokyo (JP); Tomomi Tsubakisawa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 35 days.

(21) Appl. No.: 13/262,173

(22) PCT Filed: Oct. 22, 2009

(86) PCT No.: PCT/JP2009/068209
§ 371 (c)(1),
(2), (4) Date: Sep. 29, 2011

(87) PCT Pub. No.: WO2010/113345
PCT Pub. Date: Oct. 7, 2010

(65) Prior Publication Data
US 2012/0021830 A1 Jan. 26, 2012

(30) Foreign Application Priority Data
Mar. 31, 2009 (JP) ................................ 2009-088546

(51) Int. Cl.
*G06F 17/00* (2006.01)

(52) U.S. Cl.
USPC .......................................................... 463/31

(58) Field of Classification Search
USPC ........................ 463/30–34, 37; 345/156–158
See application file for complete search history.

(56) References Cited

U.S. PATENT DOCUMENTS

| | | | | |
|---|---|---|---|---|
| 6,674,905 | B1 * | 1/2004 | Matsugu et al. | 382/199 |
| 7,578,742 | B2 * | 8/2009 | Miyamoto et al. | 463/37 |
| 8,197,342 | B2 * | 6/2012 | Kijima et al. | 463/37 |
| 2005/0176486 | A1 | 8/2005 | Nishimura et al. | |
| 2012/0021830 | A1 * | 1/2012 | Tomita et al. | 463/31 |

FOREIGN PATENT DOCUMENTS

| | | |
|---|---|---|
| JP | 2001-232066 A | 8/2001 |
| JP | 3262677 B2 | 3/2002 |
| JP | 2005-218779 A | 8/2005 |
| JP | 2008-154777 A | 7/2008 |

* cited by examiner

*Primary Examiner* — Ronald Laneau
(74) *Attorney, Agent, or Firm* — Sughrue Mion, PLLC

(57) ABSTRACT

To provide a game device capable of allowing a user, when selecting any selected image candidate, to experience a real feeling of the relationship with another selected image candidate. A determination unit (70*a*) determines whether or not the designated area designated by a user is included in the determination area for a selected image candidate. When the designated area is included in the determination area, the designation unit (72*a*) designates the selected image candidate corresponding to the determination area as a selected image. A determination area control unit (68) changes the size of a determination area for another selection candidate image, based on a parameter stored so as to be correlated to a combination of the selected image candidate designated as a selected image and the other selected image candidate. A designated area control unit (82) changes the size of the designated area, based on a parameter stored so as to be correlated to a combination of the selected image candidate designated as the selected image and a selected image candidate located closest to the designated area.

10 Claims, 14 Drawing Sheets

FIG.9

| PLAYER | CONDITION | | | | | | DETERMINATION AREA (Rj) |
|---|---|---|---|---|---|---|---|
| | BALL HOLDING | POSITION | MOVING DIRECTION | POSTURE | ACTION | SELECTION | |
| 1 | 1 | – | – | – | – | 1 | – |
| 2 | 0 | – | – | – | – | 0 | – |
| 3 | 0 | – | – | – | – | 0 | – |
| 4 | 0 | – | – | – | – | 0 | – |
| ⋮ | ⋮ | ⋮ | ⋮ | ⋮ | ⋮ | ⋮ | ⋮ |
| 11 | 0 | – | – | – | – | 0 | – |
| 12 | 0 | – | – | – | – | | |
| ⋮ | ⋮ | ⋮ | ⋮ | ⋮ | ⋮ | | |
| 22 | 0 | – | – | – | – | | |

FIG.10

| COMBINATION (PLAYER ID COMBINATION) | COOPERATION PARAMETER C |
|---|---|
| "1" AND "2" | 94 |
| "1" AND "3" | 83 |
| "1" AND "4" | 50 |
| "1" AND "5" | 40 |
| ⋮ | ⋮ |
| "9" AND "10" | – |
| "9" AND "11" | – |
| "10" AND "11" | – |

FIG.11

| PARAMETER CONDITION | SIZE DATA (Rj) |
|---|---|
| $1 \leq C \leq 20$ | Rj1 |
| $20 < C \leq 40$ | Rj2 |
| $40 < C \leq 60$ | Rj3 |
| $60 < C \leq 80$ | Rj4 |
| $80 < C \leq 100$ | Rj5 |

$Rj1 < Rj2 < Rj3 < Rj4 < Rj5$

| PARAMETER CONDITION | SIZE DATA (Rc) |
|---|---|
| $1 \leqq C \leqq 20$ | Rc1 |
| $20 < C \leqq 40$ | Rc2 |
| $40 < C \leqq 60$ | Rc3 |
| $60 < C \leqq 80$ | Rc4 |
| $80 < C \leqq 100$ | Rc5 |

Rc1<Rc2<Rc3<Rc4<Rc5

| PARAMETER CONDITION | SIZE DATA (Rj) |
|---|---|
| $1 \leq C \leq 20$ | $Rj = \Delta RJ1 * T + RJ1$ |
| $20 < C \leq 40$ | $Rj = \Delta RJ2 * T + RJ2$ |
| $40 < C \leq 60$ | $Rj = \Delta RJ3 * T + RJ3$ |
| $60 < C \leq 80$ | $Rj = \Delta RJ4 * T + RJ4$ |
| $80 < C \leq 100$ | $Rj = \Delta RJ5 * T + RJ5$ |

$\Delta RJ1 < \Delta RJ2 < \Delta RJ3 < \Delta RJ4 < \Delta RJ5$
$RJ1 < RJ2 < RJ3 < RJ4 < RJ5$

FIG.21

| PARAMETER CONDITION | SIZE DATA (Rc) |
|---|---|
| $1 \leqq C \leqq 20$ | $Rc = \Delta RC1 * T + RC1$ |
| $20 < C \leqq 40$ | $Rc = \Delta RC2 * T + RC2$ |
| $40 < C \leqq 60$ | $Rc = \Delta RC3 * T + RC3$ |
| $60 < C \leqq 80$ | $Rc = \Delta RC4 * T + RC4$ |
| $80 < C \leqq 100$ | $Rc = \Delta RC5 * T + RC5$ |

$\Delta RC1 < \Delta RC2 < \Delta RC3 < \Delta RC4 < \Delta RC5$
$RC1 < RC2 < RC3 < RC4 < RC5$

GAME DEVICE, METHOD FOR CONTROLLING GAME DEVICE, PROGRAM, AND INFORMATION STORAGE MEDIUM

TECHNICAL FIELD

The present invention relates to a game device, a game device control method, a program, and an information storage medium.

BACKGROUND ART

There is known a game device in which a plurality of selected image candidates are shown on a display means, and when a position (a designated area) designated by a user is included in a determination area for a selected image candidate, the selected image candidate is specified as a selected image (an image selected by a user).

For example, there is known a game device in which a plurality of characters are shown on a display means, and when a position (a designated area) designated by a user is included in a determination area for any character (selected image candidate), that character is determined as being selected, and a game process correlated to that character is carried out. For example, there is known a soccer game in which when a user selects a character belonging to the team to which a character holding a ball belongs, the ball holding character passes the ball to the character selected by the user.

PRIOR ART DOCUMENT

Patent Document 1: Japanese Patent Laid-open Publication No. 2008-154777

DISCLOSURE OF THE INVENTION

Problems to be Solved by the Invention

For example, in an actual sport match, a ball may be passed smoothly or not smoothly between players, depending on the relationship (e.g., chemistry or smoothness in cooperation) between the players.

Regarding this point, a conventional soccer game device is not sufficiently successful in allowing a user, when designating a character, to experience the real feeling of the relationship (e.g., chemistry and/or smoothness in cooperation) with another character. In particular, when one user operates two or more characters while switching, it is difficult to allow the user to experience a real feeling (e.g., chemistry and/or smoothness in cooperation) of the relationship between the characters as it is actually one character which is operated.

The present invention has been conceived in view of the above, and an object thereof is to provide a game device, a game device control method, a program, and an information storage medium capable of allowing a user, when selecting any selected image candidate, to experience a real feeling of the relationship with another selected image candidate.

Means for Solving the Problems

In order to solve the above described problem, a game device according to the present invention comprises a display control means for displaying a plurality of selected image candidates on a display means; a parameter storage means for storing a parameter so as to be correlated to a combination of the selected image candidates; a designated area obtaining means for obtaining a designated area designated by a user; a determination means for determining whether or not the designated area obtained by the designated area obtaining means is included in a determination area for the selected image candidate; a designation means for designating a selected image candidate corresponding to the determination area as a selected image when the designated area obtained by the designated area obtaining means is included in the determination area; a determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate; a specifying means for specifying, when any of the plurality of selected image candidates is designated as the selected image by the designation means, a selected image candidate located closest to the designated area among other selected image candidates of the plurality of selected image candidates; and a designated area control means for changing a size of the designated area, based on a parameter stored so as to be correlated to a combination of the selected image candidate designated as the selected image and the selected image candidate specified by the specifying means.

A game device control method according to the present invention comprises a display control step of displaying a plurality of selected image candidates on a display means; a step of reading content stored in a parameter storage means for storing a parameter so as to be correlated to a combination of the selected image candidates; a designated area obtaining step of obtaining a designated area designated by a user; a determination step of determining whether or not the designated area obtained at the designated area obtaining step is included in a determination area for the selected image candidate; a designation step of designating a selected image candidate corresponding to the determination area as a selected image when the designated area obtained at the designated area obtaining step is included in the determination area; a determination area control step of changing, when any of the plurality of selected image candidates is designated as the selected image at the designation step, a size of a determination area for another selected image candidate among the plurality of selected image candidates, based on a parameter stored so as to be correlated to a combination of the selected image candidate designated as the selected image and the other selected image candidate; a specifying step of specifying, when any of the plurality of selected image candidates is designated as the selected image at the designation step, a selected image candidate located closest to the designated area among the other selected image candidates in the plurality of selected image candidates; and a designated area control step of changing a size of the designated area, based on a parameter stored so as to be correlated to a combination of the selected image candidate designated as the selected image and the selected image candidate specified at the specifying step.

A program according to the present invention is a program for causing a computer, such as a consumer game device, a commercial game device, a portable game device, a personal digital assistant, and so forth, to function as a game device, the program for causing the computer to function as: a display control means for displaying a plurality of selected image candidates on a display means; a means for reading content stored in a parameter storage means for storing a parameter so as to be correlated to a combination of the selected image candidates; a designated area obtaining means for obtaining a designated area designated by a user; a determination means for determining whether or not the designated area obtained by the designated area obtaining means is included in a determination area for the selected image candidate; a designation means for designating a selected image candidate corresponding to the determination area as a selected image when the designated area obtained by the designated area obtaining means is included in the determination area; a determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate; a specifying means for specifying, when any of the plurality of selected image candidates is designated as the selected image by the designation means, a selected image candidate located closest to the designated area among the other selected image candidates in the plurality of selected image candidates; and a designated area control means for changing a size of the designated area, based on a parameter stored so as to be correlated to a combination of the selected image candidate designated as the selected image and the selected image candidate specified by the specifying means.

An information storage medium according to the present invention is a computer readable information storage medium storing the above described program.

According to the present invention, when a user carries out an operation of selecting any selected image candidate, it is possible to cause a user to experience a real feeling of the relationship with another selected image candidate.

According to one aspect of the present invention, the determination area control means may include a first change means for changing a size of a determination area for another selected image candidate, depending on a period of time elapsed after a reference time, and a means for controlling the size of the determination area for the other selected image candidate before being changed by the first change means, or controlling a manner in which the first change means changes the size of the determination area for the other selected image candidate, based on a parameter stored so as to be correlated to a combination of the selected image candidate designated as the selected image and the other selected image candidate, and the designated area control means may include a second change means for changing a size of the designated area, depending on the period of time elapsed after the reference time, and a means for controlling the size of the designated area before being changed by the second change means or controlling a manner in which the second change means changes the size of the designated area, based on a parameter stored so as to be correlated to a combination of the selected image candidate designated as the selected image and the selected image candidate specified by the specifying means.

A game device according to the present invention comprises a display control means for displaying a plurality of selected image candidates on a display means; a parameter storage means for storing a parameter so as to be correlated to a combination of the selected image candidates; a designated position obtaining means for obtaining a position designated by a user; a determination means for determining whether or not the position obtained by the designated position obtaining means is included in a determination area for the selected image candidate; a designation means for designating, when the position obtained by the designated position obtaining means is included in the determination area, a selected image candidate corresponding to the determination area as a selected image; and a determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate According to the present invention, when a user carries out an operation of selecting any selected image candidate, it is possible to cause a user to experience a real feeling of the relationship with another selected image candidate.

A game device according to the present invention comprises a display control means for displaying a plurality of selected image candidates on a display means; a parameter storage means for storing a parameter so as to be correlated to a combination of the selected image candidates; a designated area obtaining means for obtaining a designated area designated by a user; a determination means for determining whether or not the designated area obtained by the designated area obtaining means is included in a determination area for the selected image candidate; a designation means for designating a selected image candidate corresponding to the determination area as a selected image when the designated area obtained by the designated area obtaining means is included in the determination area; a specifying means for specifying a selected image candidate located closest to the designated area, when any of the plurality of selected image candidates is designated as the selected image by the designation means, among other selected image candidates of the plurality of selected image candidates, and a designated area control means for changing a size of the designated area, based on a parameter stored so as to be correlated to a combination of the selected image candidate designated as the selected image and the selected image candidate specified by the specifying means.

According to the present invention, when a user carries out an operation of selecting any selected image candidate, it is possible to cause a user to experience a real feeling of the relationship with another selected image candidate.

BRIEF DESCRIPTION OF THE DRAWINGS

FIG. 9 is a diagram showing one example of a game situation data;

FIG. 10 is a diagram showing one example of a parameter table;

FIG. 11 is a diagram showing one example of a parameter condition table;

FIG. 21 is a diagram showing one example of a parameter condition table.

BEST MODE FOR CARRYING OUT THE INVENTION

1. First Embodiment

In the following, a first embodiment of the present invention will be described in detail based on the accompanying drawings. A game device according to an embodiment of the present invention is realized using, e.g., a consumer game device (an installed type game device), a portable game device, a portable phone, a personal digital assistant (PDA), a personal computer, or the like. Below, a case in which a game device according to the first embodiment is realized using a consumer game device will be described.

[1-1. Hardware Structure of Game Device]

Figure 1:
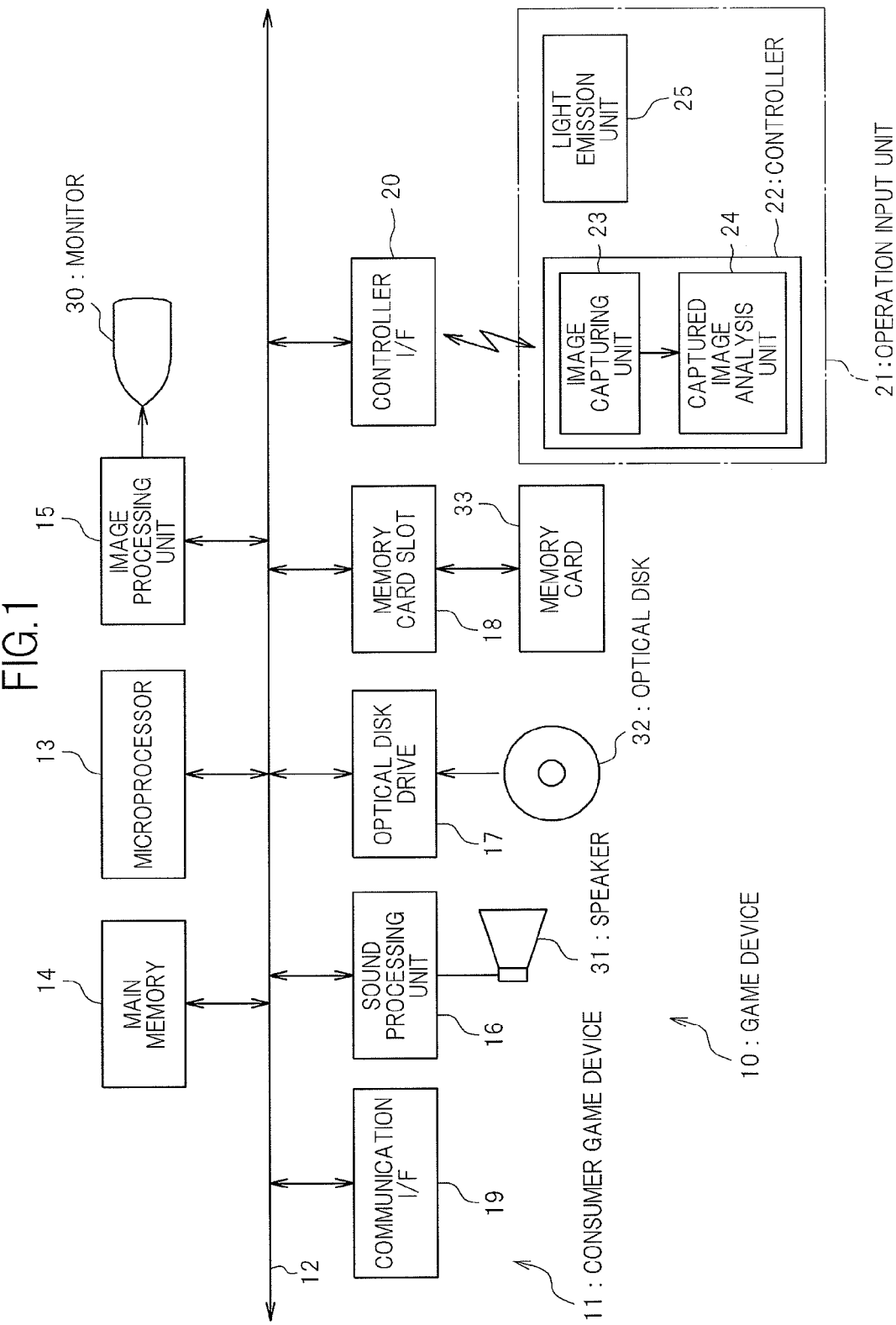
FIG. 1 is a diagram showing a hardware structure of a game device according to an embodiment of the present invention.

FIG. 1 is a diagram showing a hardware structure of a game device according to the first embodiment. The game device 10 shown in FIG. 1 comprises a consumer game device 11, a monitor 30, a speaker 31, an optical disk 32, and a memory card 33. The monitor 30 and the speaker 31 are connected to the consumer game device 11. The optical disk 32 and the memory card 33 are information storage media and mounted in the consumer game device 11. As the monitor 30, for example, a home-use television set receiver is used; as the speaker 31, for example, a speaker built in a home-use television set receiver is used. As the optical disk 32, for example, a CD-ROM, a DVD-ROM, and so forth are used.

The consumer game device 11 is a publicly known computer game system. The consumer game device 11 comprises a bus 12, a microprocessor 13, a main memory 14, an image processing unit 15, a sound processing unit 16, an optical disk drive 17, a memory card slot 18, a communication interface (I/F) 19, a controller interface (I/F) 20, and an operation input unit 21. Structural elements other than the operation input unit 21 are accommodated in an enclosure of the consumer game device 11.

The bus 12 is a communication path for exchanging an address and data among the respective units of the consumer game device 11. The microprocessor 13, main memory 14, image processing unit 15, sound processing unit 16, optical disk drive 17, memory card slot 18, communication interface 19, and controller interface 20 are mutually connected to exchange data via the bus 12.

The microprocessor 13 controls the respective units of the consumer game device 11, based on an operating system stored in a ROM (not shown) or a program and data read from the optical disk 32 or the memory card 33. The main memory 14 comprises, for example, a RAM, and a program and data read from the optical disk 32 or the memory card 33 is written into the main memory 14 when necessary. The main memory 14 is used also as a working memory of the microprocessor 13.

The image processing unit 15 includes a VRAM, and renders a game screen image in the VRAM, based on image data sent from the microprocessor 13. The image processing unit 15 converts a game screen image into a video signal, and outputs to the monitor 30 at a predetermined time. The sound processing unit 16 includes a sound buffer, and reproduces sound data read from the optical disk 32 into the sound buffer to thereby output various game sounds (game music, game sound effects, message, and so forth) via the speaker 31.

According to an instruction from the microprocessor 13, the optical disk drive 17 reads a program and data recorded on the optical disk 32. Note that although the optical disk 32 is used here to provide a program and data to the consumer game device 11, any other information storage medium, such as, for example, a memory card 33, or the like, may be used. Alternatively, a program and data may be supplied from a remote place to the consumer game device 11 via a data communication network, such as the Internet, or the like.

The memory card slot 18 is an interface for mounting a memory card 33. The memory card 33 comprises a nonvolatile memory (e.g., EEPROM or the like), and stores various game data such as, for example, save data, or the like. The communication interface 19 is an interface for connecting for communication to a data communication network, such as the Internet, or the like.

The controller interface 20 is an interface for connecting a plurality of controllers 22 by radio. As a controller interface 20, an interface in accordance with, for example, the Bluetooth (registered trademark) interface standard can be used. Note that alternatively, the controller interface 20 may be an interface for connecting the controller 22 in a wired manner.

Figure 2:
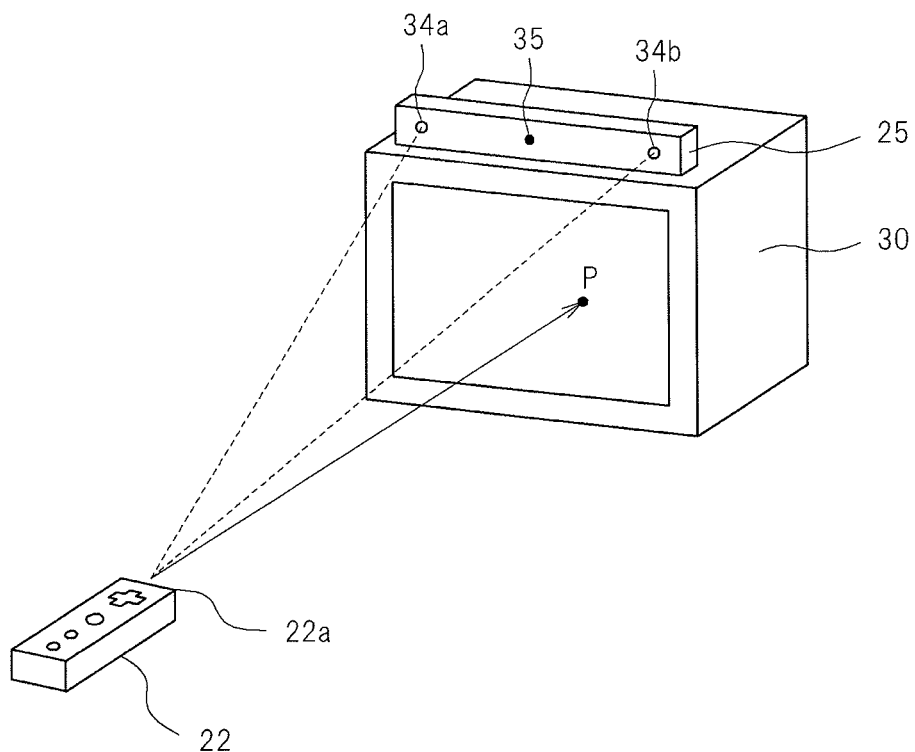
FIG. 2 is a diagram showing one example of an operation input unit.

The operation input unit 21 is used by a user to input operation. The operation input unit 21 has a function as, for example, a pointing device for use by a user to designate a position in a game screen image displayed on the monitor 30. As an operation input unit 21, a technique such as is disclosed in, for example, Japanese Patent No. 3262677 can be utilized. The operation input unit 21 comprises the controller 22 and a light emission unit 25. FIG. 2 shows one example of the operation input unit 21 while FIG. 3 shows one example of the controller 22.

As shown in FIG. 2, the light emission unit 25 has a plurality of light sources, and is mounted on the upper portion of the monitor 30. In the example shown in FIG. 2, the light emission unit 25 has light sources 34a, 34b provided each on each end thereof. Alternatively, the light emission unit 25 may be mounted on the lower portion of the monitor 30.

Figure 3:
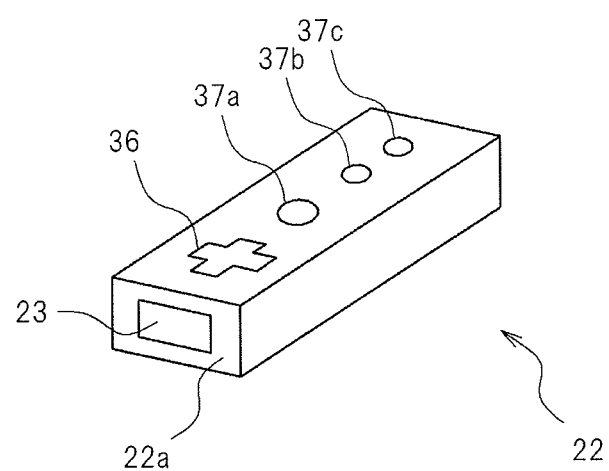
FIG. 3 is a diagram showing one example of a controller.

As shown in FIG. 3, the controller 22 has a direction button 36 and buttons 37a, 37b, 37c. The direction button 36 has a cross shape, and is generally used for a direction designation operation. The buttons 37a, 37b, 37c are used for various game operations. The controller 22 has an image capturing unit 23 and a captured image analysis unit 24, as shown in FIG. 1. The image capturing unit 23 may be an image capturing element such as, for example, a CCD, or the like, and provided on the front end portion 22a of the controller 22. The captured image analysis unit 24 is, for example, a microprocessor, and built in the controller 22.

When a user points the front end portion 22a of the controller 22 at the monitor 30, the light sources 34a, 34b are shown on a captured image captured by the image capturing unit 23. The captured image analysis unit 24 analyzes the positions of the light sources 34a, 34b shown on the captured image captured by the image capturing unit 23, and determines the position and inclination of the controller 22, based on the analyzed result. For example, the captured image analysis unit 24 calculates the relative position of the controller 22 relative to a predetermined reference position 35 and the inclination angle of the controller 22 relative to the straight line connecting the light sources 34a and 34b. Information concerning the positional relationship between the reference position 35 and a game screen image shown on the monitor 30 is stored in advance in the game device 10, and the screen coordinate values (coordinate values in a screen coordinate system) of a position P pointed at by the front end 22a of the controller 22 are obtained based on the positional relationship information and the position and inclination of the controller 22 obtained by the captured image analysis unit 24.

Note that information describing the position and inclination of the controller 22, obtained by the captured image analysis unit 24, that is, information specifying the screen coordinate values of a position P pointed at by the front end portion 22a of the controller 22, is referred to as "pointing information".

The controller 22 sends to the microprocessor 13 an operation signal describing the state of operation on the controller 22 every constant period (e.g., every $\frac{1}{60}^{th}$ of a second) via the controller interface 20. An operation signal contains, for example, the above-described pointing information and information describing the state of each button being pressed. Based on an operation signal supplied from the controller 22, the microprocessor 13 specifies a position P pointed at by the front end portion 22a of the controller 22 or determines whether or not the direction button 36 or the buttons 37a, 37b, 37c on the controller 22 has been pressed.

[1-2. Game Carried Out in Game Device]

In the above described game device 10, a soccer game in which a soccer match is carried out between a user's operating team and an opponent team is carried out. This soccer game is realized by carrying out a program read from the optical disk 32.

Figure 4:
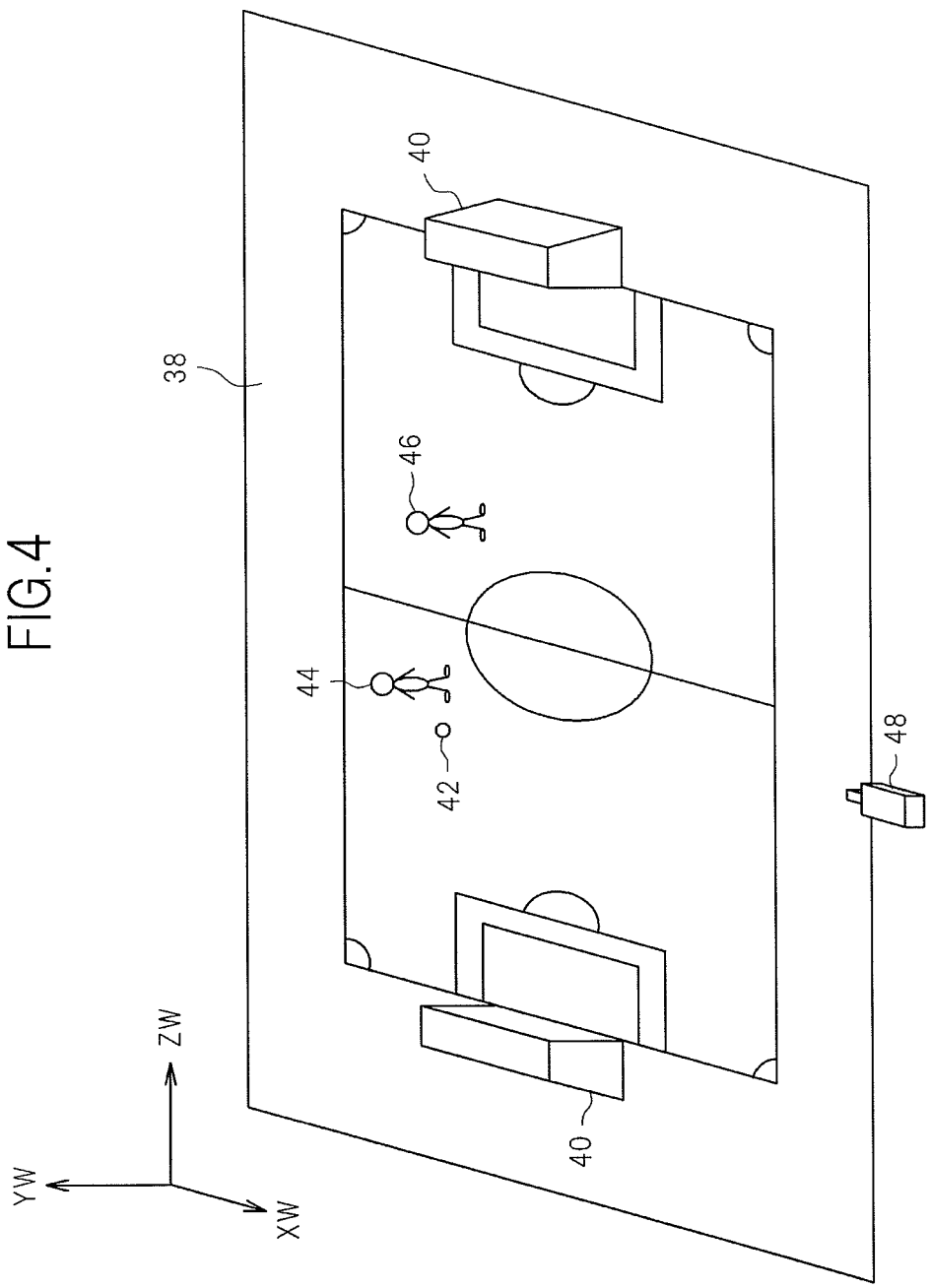
FIG. 4 is a diagram showing one example of a virtual three dimensional space.

A virtual three dimensional space is created in the main memory 14 of the game device 10. FIG. 4 shows one example of the virtual three dimensional space. As shown in FIG. 4, in the virtual three dimensional space, an Xw axis, a Yw axis, and a Zw axis are defined orthogonally intersecting one another. A position in the virtual three dimensional space is specified by world coordinate values (coordinate values in the world coordinate system) according to these coordinate axes. Further, a field object 38 representing a soccer field is placed in the virtual three dimensional space. The field object 38 is placed, for example, parallel to the Xw-Zw plane.

On the field object 38, the objects below are placed:
(1) a ball object 42 representing a soccer ball (moving object);
(2) two goal objects 40; and
(3) eleven player objects 44 and eleven player objects 46.

The ball object 42 moves in the virtual three dimensional space. The ball object 42 having gotten closer to any player object 44 (46) is correlated to the player object 44 (46). With the ball object 42 correlated to a player object 44 (46), the player object 44 (46) is placed in the state of holding the ball object 42. Once the ball object 42 is correlated to a player object 44 (46), the ball object 42 will thereafter move following the movement of the player object 44 (46).

One of the goal objects 40 is correlated to the operating team, while the other goal object 40 is correlated to the opponent team. With the ball 42 having moved into a goal object 42 correlated to either team, a score event occurs to the other team. Note that the following description is made based on the assumption that the goal object 40 on the right side in FIG. 4 is correlated to the operating team, while that on the left side in FIG. 4 is correlated to the opponent team.

A player object 44 represents a soccer player belonging to the operating team, while a player object 46 represents a soccer player belonging to the opponent team. In FIG. 4, one player object 44 and one player object 46 are shown.

In the virtual three dimensional space, a virtual camera 48 (a viewpoint and a viewing direction) is set. The virtual camera 48 moves following, for example, the movement of the ball object 42. A game screen image showing a picture obtained by viewing the virtual three dimensional space from the virtual camera 48 is displayed on the monitor 30 (display means).

Figure 5:
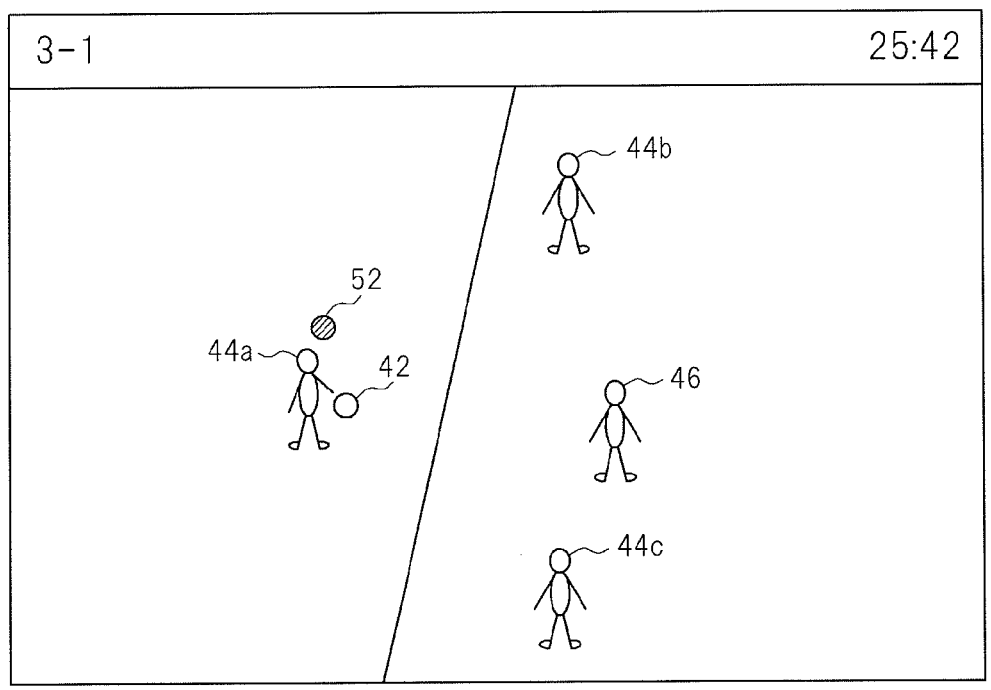
FIG. 5 is a diagram showing one example of a game screen image.

FIG. 5 shows one example of a game screen image. In the game screen image shown in FIG. 5, the ball object 42, three player objects 44a, 44b, 44c belonging to the operating team and one player object 46 belonging to the opponent team are shown. In the game screen image shown in FIG. 5, the ball object 42 is held by the player object 44a. In the game screen image, a cursor 52 is shown. A cursor 52 is shown in a position designated by a user in a game screen image.

Each of the player objects 44, 46 automatically acts according to a predetermined action algorithm. However, a user can select a player object 44 belonging to the operating team and designate an action to be taken by the selected player object 44. For example, a user can select the player object 44 holding the ball object 42, and further select another player object 44 as a pass receiving party to thereby cause the player object 44 holding the ball object 42 to pass to the other player object 44.

In the following, an operation for causing the player object 44a holding the ball object 42 to pass to the other player object 44b in the game screen image shown in FIG. 5 will be described.

Initially, a user selects the player object 44a as an operation target. Specifically, in this case, a user points out the player object 44a, using the front end portion 22a of the controller 22. That is, a user points the front end portion 22a of the controller 22 at the player object 44a to move the cursor 52 to the player object 44a. Then, a user presses a selection button (e.g., the button 37a). With the selection button pressed while the front end portion 22a of the controller 22 is kept pointed at the player object 44a, the player object 44a is thereby placed in the state of being selected as an operation target.

In this embodiment, whether or not the front end portion 22a of the controller 22 is pointing at the player object 44a is determined as described below.

Figure 6:
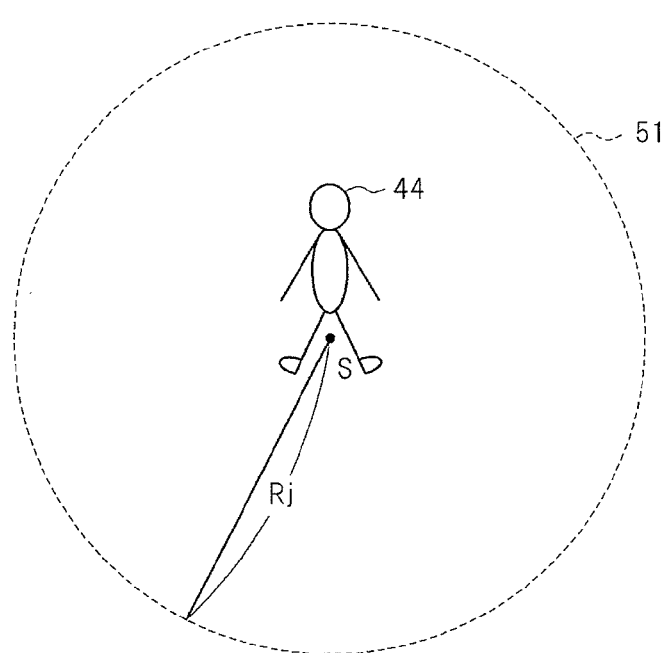
FIG. 6 is a diagram explaining a determination area.

That is, in this embodiment, a determination area is set for each player object 44. FIG. 6 is a diagram explaining a determination area, showing one example of a determination area 51 set for a player object 44. A determination area 51 is defined based on the position of a player object 44. Specifically, a determination area 51 is a circular area having a radius Rj and the reference position S determined based on the position of a player object 44, as the center. That is, the reference position S is a position corresponding to the representative position of a player object 44, here being a position in a game screen image corresponding to the representative position of a player object 44. As the reference position S is a position in a game screen image, a determination area 51 is set in a game screen image here.

In this embodiment, when the cursor 52 is at least partially included in the determination area 51 for any player object 44, the player object 44 is determined as being pointed at by the front end portion 22a of the controller 22.

Figure 7:
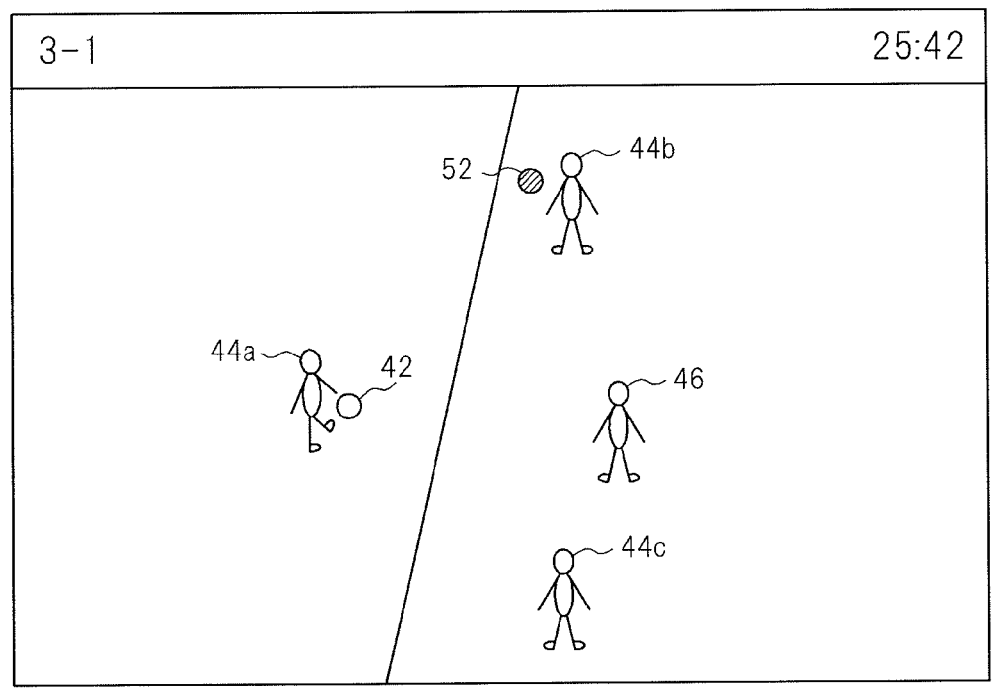
FIG. 7 is a diagram showing one example of a game screen image.

After selection of the player object 44a, in order to select the player object 44b as a receiver of a pass from the player object 44a, a user points out the player object 44b, using the front end portion 22a of the controller 22. That is, a user points the front end portion 22a of the controller 22 at the player object 44b to thereby move the cursor 52 to the player object 44b. Then, a user presses a pass instruction button (e.g., the button 37b). When the pass instruction button is pressed while the player object 44b is kept pointed at by the front end portion 22a of the controller 22, the player object 44b is placed in the state of being selected as a pass receiver. With the player object 44b selected as a pass receiver, the player object 44a passes to the player object 44b. FIG. 7 shows one example of a game screen image to be shown when the player object 44a passes to the player object 44b.

In the game device 10, ease in selection of a player object 44 as, for example, a pass receiver, or the like, when another player object 44 is already selected as an operation target is changed, depending on the relationship (e.g., chemistry or smoothness in cooperation) between the player object 44 selected as an operation target and a player object 44 to be selected as a pass receiver.

In the above example, for example, ease in selection of the player object 44b as a pass receiver to receive a pass from the player object 44a holding the ball object 42a is controlled based on the relationship between the player object 44a and the player object 44b.

Specifically, the size of the determination area 51 for the player object 44b is changed based on the relationship between the player object 44a and the player object 44b.

For example, when the relationship between the player object 44a and the player object 44b is preferable, a larger determination area 51 is set for the player object 44b. In this case, the cursor 52 can be relatively easily at least partially included in the determination area 51, so that a user can readily select the player object 44b as a pass receiver. Meanwhile, when the relationship between the player object 44a and the player object 44b is not preferable, a smaller determination area 51 is set for the player object 44b. In this case, it is relatively difficult for the cursor 52 to be at least partially included in the determination area 51, and thus a user can not readily select the player object 44b as a pass receiver.

As described above, in this embodiment, ease in selection of a player object 44 as a pass receiver to receive a pass from the player object 44 holding the ball object 42 is changed, depending on the relationship (e.g., chemistry or smoothness in cooperation) between the player object 44 holding the ball object 42 and a player object 44 to be selected as a pass receiver, so that a user can experience a real feeling of the relationship (e.g., chemistry or smoothness in cooperation) between the player object 44 holding the ball object 42 and a player object 44 being a candidate for a pass receiver.

[1-3. Functions Realized in Game Device]

Figure 8:
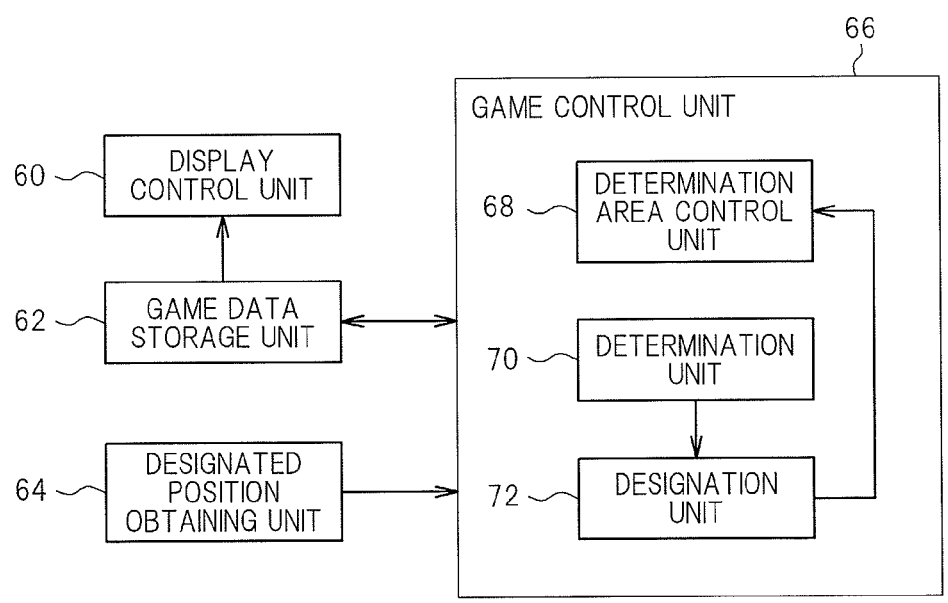
FIG. 8 is a functional block diagram showing functions realized in a game device according to a first embodiment.

FIG. 8 is a functional block diagram showing functions realized in the game device 10. As shown in FIG. 8, a display control unit 60, a game data storage unit 62, a designated position obtaining unit 64, and a game control unit 66 are realized in the game device 10. These functions are realized by the microprocessor 13 operating according to a program read from the optical disk 32.

[1-3-1. Display Control Unit]

The display control unit 60 is realized mainly using the microprocessor 13. The display control unit 60 shows a plurality of selected image candidates on the monitor 30 or a display means. In this embodiment, the display control unit 60 shows a game screen image such as is shown in FIG. 5 or 7 on the monitor 30, based on the game situation data stored in the game data storage unit 62 to be described later. In this embodiment, a player object 44 belonging to the operating team corresponds to a "selected image candidate".

[1-3-2. Game Data Storage Unit]

A game data storage unit 62 is realized mainly using the main memory 14 and the optical disk 32. The game data storage unit 62 stores various data necessary for a soccer game. In this embodiment, the game data storage unit 62 stores game situation data, a parameter table, and a parameter condition table.

[Game Situation Data]

Game situation data is stored in the main memory 14. The game situation data is data describing the current situation of a virtual three dimensional space. A virtual three dimensional space is created in the main memory 14, based on the game situation data. FIG. 9 shows content of the game situation data.

As shown in the diagram, the game situation data is a table correlating each of the player objects 44, 46 and data on the player object 44, 46. The game situation data includes a player field, a condition field, and a determination area field.

In the player field, the ID (hereinafter referred to as a player ID) of each player object is stored. Note that player objects with player ID's "1" to "11" are player objects 44 belonging to the operating team, while those with player ID's "12" to "22" are player objects 46 belonging to the opponent team.

In the condition field, data on the current situation of each player object 44, 46 is stored. Specifically, the condition field includes a ball holding field, a position field, a moving direction field, a posture field, an action field, and a selection field. In the ball holding field, data indicating whether or not a player object 44, 46 holds the ball object 42 is stored. For example, "1" is stored in the ball holding field when a player object 44, 46 holds the ball object 42, and "0" is stored in the ball holding field when a player object 44, 46 does not hold the ball object 42. In the position field, data describing the current position of the representative point of a player object 44, 46 is stored. In the moving direction field, data describing the current moving direction of a player object 44, 46 is stored. In the posture field, data describing the current posture of a player object 44, 46 is stored. In the action field, data describing the type of action being currently carried out by a player object 44, 46 is stored. In the selection field, the value of a selection flag indicating whether or not a player object 44 is currently selected as an operation target of a user is stored. For example, "1" is stored as the value of a selection flag in the selection field when a player object 44 is currently selected as an operation target, while "0" is stored as the value of a selection flag in the selection field when a player object 44 is not currently selected as an operation target.

In the determination area field, data on the size of the determination area 51 for each player object 44 is stored. Note that the size of a determination area 51 refers to the size of the area of a determination area 51 when the determination area 51 is a two dimensional area and the size of the volume of a determination area 51 when the determination area 51 is a three dimensional area. In this embodiment, in which the determination area 51 is a circular area, the value of the radius Rj of the determination area 51 is stored in the determination area field. Note that, for example, for a rectangular determination area 51, the length of each side of the rectangular area is stored in the determination area field. At the beginning of a game, a predetermined initial value is stored in each determination area field, and the size (radius Rj) of the determination area 51 for each player object 44 is set to the predetermined initial value.

Note that the game situation data includes, beside the above described data, data describing the current position and viewing direction of the virtual camera 48, and the current position, moving direction, and moving speed of the ball object 42.

[Parameter Table]

A parameter table is stored in the optical disk 32. The parameter table (parameter storage means) stores parameters concerning relationship (e.g., chemistry or smoothness in cooperation) between a plurality of player objects 44 (a plurality of selected image candidates) composing each combination of player objects 44 (selected image candidates) so as to be correlated to the combination. FIG. 10 shows content of the parameter table.

As shown in the diagram, the parameter table is data correlating a combination of the ID's of two player objects 44 and a cooperation parameter C. A cooperation parameter C is data describing, in the form of a number, smoothness with which two player object 44 cooperate with each other, corresponding to a parameter concerning the relationship between the two player objects 44. In this embodiment, the parameter table is defined such that smoother cooperation between two player objects 44 results in a larger value of a cooperation parameter C.

[Parameter Condition Table]

A parameter condition table is recorded on the optical disk 32. FIG. 11 shows content of the parameter condition table. As shown in the diagram, the parameter condition table is data correlating a parameter condition concerning a cooperation parameter C and size data for controlling the size of a determination area 51. In the parameter condition table shown, the value of the radius Rj of a determination area 51 is stored as size data. In FIG. 11, the parameter condition table is defined such that a larger value of a cooperation parameter C results in a larger value of the radius Rj.

[1-3-3. Designated Position Obtaining Unit]

The designated position obtaining unit 64 (designated position obtaining means) is realized mainly using the microprocessor 13, the controller interface 20, and the operation input unit 21. The designated position obtaining unit 64 obtains a position designated by a user in a game screen image.

Figure 12:
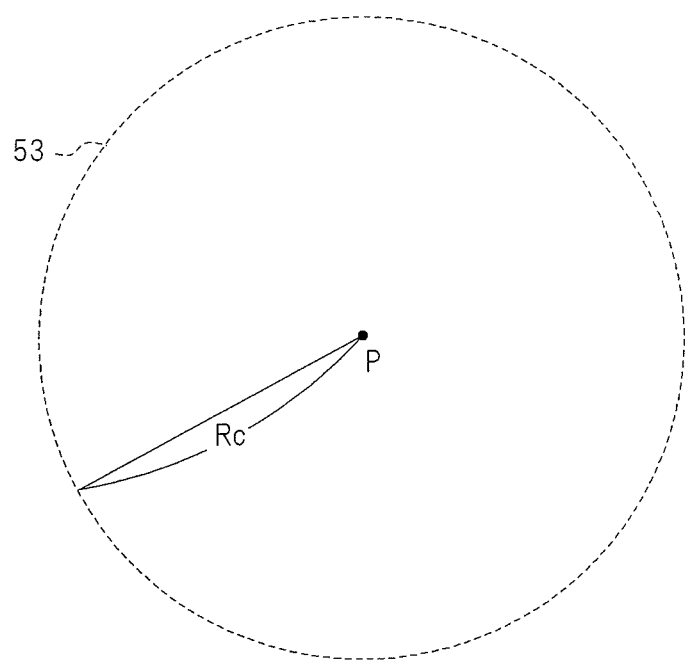
FIG. 12 is a diagram explaining a designated area of a cursor.

In this embodiment, the designated position obtaining unit 64 obtains the screen coordinate values of a position P pointed at by the front end portion 22a of the controller 22 every constant period, based on an operation signal sent from the controller 22, and then obtains the designated area of the cursor 52, based on the position P pointed at by the front end portion 22a of the controller 22. FIG. 12 is a diagram explaining the designated area of the cursor 52. As shown in FIG. 12, the designated area 53 of the cursor 52 is a circular area having the radius Rc and the position P pointed at by the front end portion 22a of the controller 22 as the center. The designated area 53 of the cursor 52 coincides with the area where the cursor 52 is displayed, and also corresponds to the positions (a set of positions) designated by a user in a game screen image. That is, the respective positions in the designated area 53 of the cursor 52 correspond to the positions designated by a user in a game screen image. In this embodiment, the radius Rc of the designated area 53 of the cursor 52 is a fixed value. Note that the designated area 53 of the cursor 52 is hereinafter simply referred to as a "designated area 53".

[1-3-4. Game Control Unit]

The game control unit 66 is realized mainly using, for example, the microprocessor 13. The game control unit 66 includes, as functions according to the present invention, a determination area control unit 68, a determination unit 70, and a designation unit 72.

[Determination Unit]

The determination unit 70 determines whether any of the player objects 44 (selected image candidates) is designated by a user. That is, the determination unit 70 determines whether the position (designated area 53) obtained by the designated position obtaining unit 64 is included in the determination area 51 for any player object 44 (selected image candidate). Details of operation of the determination unit 70 will be described later (see S103 in FIG. 13).

[Designation Unit]

When any of the player objects 44 (selected image candidate) is designated by a user, that is, when it is determined that the position (designated area 53) obtained by the designated position obtaining unit 64 is included in the determination area 51 for any player object 44, the designation unit 72 decides that the player object 44 (selected image candidate) has been selected by a user, and then designates the player object 44 as a selected player object (selected image). Details of an operation of the designation unit 72 will be described later (see S103 in FIG. 13).

[Determination Area Control Unit]

When any of the player objects 44 (selected image candidate) is designated as a selected player object (selected image) by the designation unit 72, the determination area control unit 68 changes the size of the determination area 51 for another player object 44 (selected image candidate), based on the cooperation parameter C stored in the parameter table so as to be correlated to the combination of the player object 44 (selected image candidate) designated as a selected player object (selected image) and that other player object 44 (selected image candidate). Details of an operation of the determination area control unit 68 will be described later (see S105 in FIG. 13).

[1-4. Process to be Carried out in Game Device]

Figure 13:
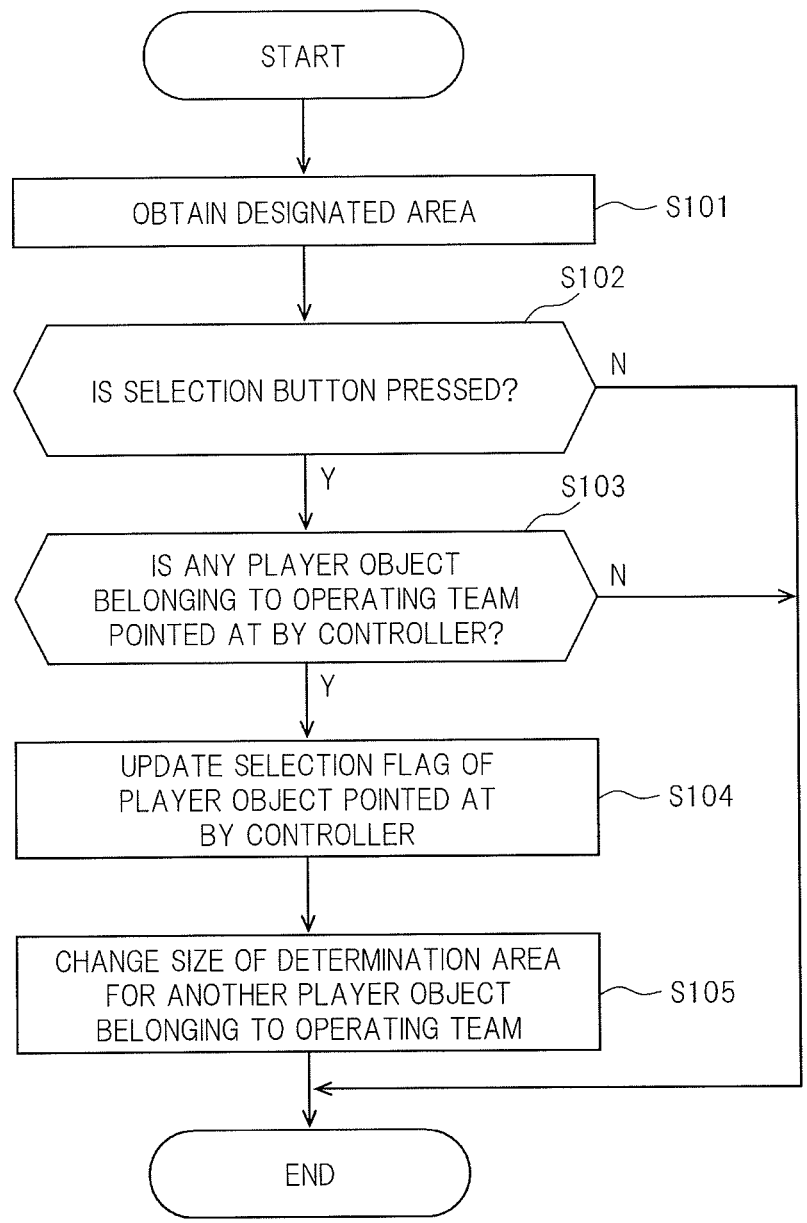
FIG. 13 is a flowchart of one example of a process to be carried out in the game device.
Figure 14:
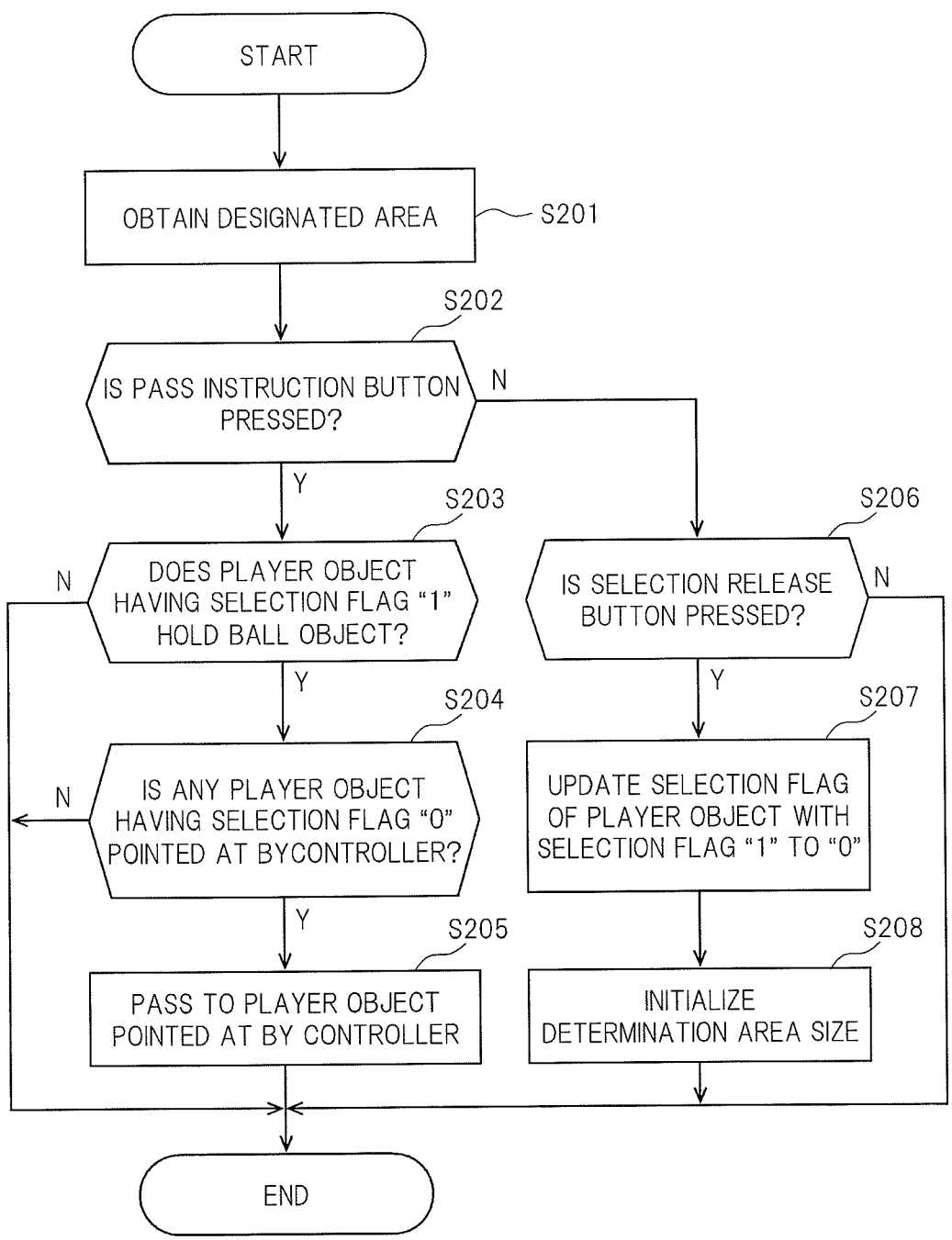
FIG. 14 is a flowchart of one example of a process to be carried out in the game device.

FIGS. 13 and 14 are flowcharts of one example of a process to be carried out in the game device 10. The process shown in FIGS. 13 and 14 are realized by the microprocessor 13 by operating according to a program.

Initially, the process shown in FIG. 13 will be described. The process shown in FIG. 13 is carried out when the values of the selection flags of all player objects 44 belonging to the operating team are "0". That is, the process shown in FIG. 13 is carried out every constant period when none of the player objects 44 belonging to the operating team are selected as an operation target.

As shown in FIG. 13, the microprocessor 13 obtains the designated area 53 (S101). Specifically, in this embodiment, the microprocessor 13 obtains the position P pointed at by the front end portion 22a of the controller 22 in a game screen image, based on an operation signal supplied from the controller 22, and then obtains, as a designated area 53, a circular area having a radius Rc and the obtained position P as the center.

Thereafter, the microprocessor 13 determines, based on an operation signal supplied from the controller 22, whether or not a selection button has been pressed (S102). With the selection button not pressed (N at S102), the microprocessor 13 terminates the process.

Meanwhile, With the selection button pressed (Y at S102), the microprocessor 13 (determination means) determines whether or not any of the player objects 44 belonging to the operating team is pointed at by the front end portion 22a of the controller 22 (S103). That is, the microprocessor 13 determines, for each player object 44, whether or not the player object 44 is pointed at by the front end portion 22a of the controller 22.

For example, in determining whether or not a player object X is pointed at by the front end portion 22a of the controller 22, the microprocessor 13 specifies the determination area 51 for the player object X with reference to the game situation data (in particular, the position field and the determination area field). In the above, the size (radius Rj) of the determination area 51 for the player object X is set to a predetermined initial value. Then, the microprocessor 13 determines whether or not the designated area 53 is at least partially included in the determination area for the player object X. When it is determined that the designated area 53 is at least partially included in the determination area 51 for the player object X, the player object X is determined as being pointed at by the front end portion 22a of the controller 22.

When no player object 44 belonging to the operating team is pointed at by the front end portion 22a of the controller 22 (N at S103), the microprocessor 13 terminates the process. Meanwhile, any of the player objects 44 belonging to the operating team is pointed at by the front end portion 22a of the controller 22 (Y at S103), the microprocessor 13 (designation means) sets the value of the selection flag of the player object 44 pointed at by the front end portion 22a of the controller 22 to "1" (S104). Note that in this case, the values of the selection flags of other player objects 44 are set to "0". With this process carried out, the player object 44 pointed at by the front end portion 22a of the controller 22 is placed in the state of being selected as an operation target.

With any of the player objects 44 belonging to the operating team being selected as an operation target, the microprocessor 13 (determination area control means) changes the sizes of the determination areas 51 for other player objects 44 belonging to the operating team (S105). That is, the size of the determination area 51 for a player object 44 having a selection flag with the value "0" among the player objects 44 belonging to the operating team is changed.

For example, the process at S105 will be described, while referring to a case as an example in which the player object X is selected as an operation target, and the size of the determination area 51 for the player object Y is changed. In this case, the microprocessor 13 initially obtains the cooperation parameter C correlated to the combination of the player object X and the player object Y from the parameter table. Then, the microprocessor 13 specifies a parameter condition satisfied by the obtained cooperation parameter C, while referring to the parameter condition table, and then updates the value of the radius Rj stored in the determination area field (see FIG. 9) for the player object Y, based on the size data correlated to the parameter condition.

Below, the process shown in FIG. 14 will be described. The process shown in FIG. 14 is carried out when the value of the selection flag of any of the player objects 44 belonging to the operating team is "1". That is, the process shown in FIG. 14 is carried out every constant period when any of the player objects 44 belonging to the operating team is selected as an operation target.

That is, the microprocessor 13 obtains the designated area 53, similarly to S101 in FIG. 13 (S201).

Then, the microprocessor 13 determines, based on an operation signal supplied from the controller 22, whether or not a pass instruction button has been pressed (S202).

With the pass instruction button pressed (Y at S202), the microprocessor 13 carries out S203 to S205.

That is, the microprocessor 13 determines whether or not a player object 44 having a selection flag with the value "1" holds the ball object 42 (S203). When no player object 44 having a selection flag with the value "1" holds the ball object 42 (N at S203), the microprocessor 13 terminates the process.

Meanwhile, when a player object 44 having a selection flag with the value "1" holds the ball object 42 (Y at S203), the microprocessor 13 determines whether or not any of the other player objects 44 belonging to the operating team is pointed at by the front end portion 22a of the controller 22. That is, the microprocessor 13 determines whether or not any of the player objects 44 having a selection flag with the value "0" is pointed at by the front end portion 22a of the controller 22 (S204). More specifically, the microprocessor 13 determines, for each player object 44 having a selection flag with the value "0", whether or not the player object 44 is pointed at by the front end portion 22a of the controller 22. For example, in determining whether or not a player object X is pointed at by the front end portion 22a of the controller 22, the microprocessor 13 (determination means) determines whether or not the designated area 53 is at least partially included in the determination area 51 for the player object X. In this case, the determination area 51 for the player object X is specified by the content of the determination area field (see FIG. 9) after the change at S105 in FIG. 13. When the designated area 53 is at least partially included in the determination area 51 for the player object X, the player object X is determined as being pointed at by the front end portion 22a of the controller 22.

When no player object 44 having a selection flag with the value "0" is pointed at by the front end portion 22a of the controller (N at S204), the microprocessor 13 terminates the process. Meanwhile, when any of the player objects 44 having a selection flag with the value "0" is pointed at by the front end portion 22a of the controller 22 (Y at S204), the microprocessor 13 causes execution of a pass to the player object 44 pointed at by the front end portion 22a of the controller 22 (S205).

Meanwhile, with the pass instruction button not pressed (N at S202), the microprocessor 13 carries out S206 to S208.

That is, the microprocessor 13 determines whether or not a selection release button (for example, the button 37a) has been pressed (S206). With the selection release button not pressed (N at S206), the microprocessor 13 terminates the process. Meanwhile, with the selection release button pressed (Y at S206), the microprocessor 13 sets the value of the selection flag of a player object 44 having a selection flag with the value "1" to "0" (S207). With S207, none of the player objects 44 belonging to the operating team are any longer selected as an operation target. Then, the microprocessor 13 initializes the size of the determination area 51 for each of the player objects 44 belonging to the operating team (S208). Specifically, the values (radius Rj) held in the determination area fields for all player objects 44 are updated to a predetermined initial value.

[1-5. Conclusion of First Embodiment]

In the game device 10 according to the above described first embodiment, ease in selection of, for example, a player object 44 as a pass receiver to receive a pass from a player object 44 holding the ball object 42 is changed depending on a combination of the player object 44 holding the ball object 42 and a player object 44 which is a candidate for a pass receiver. According to the game device 10 in the first embodiment, it is possible to allow a user to experience a real feeling of the relationship (e.g., chemistry or smoothness in cooperation) between, for example, the player object 44 holding the ball object 42 and a player object 44 which is a candidate for a pass receiver.

2. Second Embodiment

In the first embodiment, ease in selection of a player object 44 as a pass receiver, or the like, when another player object 44 belonging to the operating team is already selected as an operation target is changed by changing the size of the determination area 51 for the player object 44 to be selected as a pass receiver. Regarding this point, a second embodiment is characterized in that the size of the designated area 53 of the cursor 52, instead of the size of the determination area 51, is changed. That is, the second embodiment is characterized in that ease in selection of a player object 44 as a pass receiver when another player object 44 belonging to the operating team is already selected as an operation target is changed by changing the size (the radius Rc) of the designated area 53.

In the following, the second embodiment will be described. Note that a hardware structure of a game device 10 according to the second embodiment is identical to that in the first embodiment (see FIGS. 1 to 3), with description thereof not repeated here. Further, for example, a soccer game is carried out also in a game device 10 according to the second embodiment.

[2-1. Functions Realized in Game Device]

Figures 15, 16:
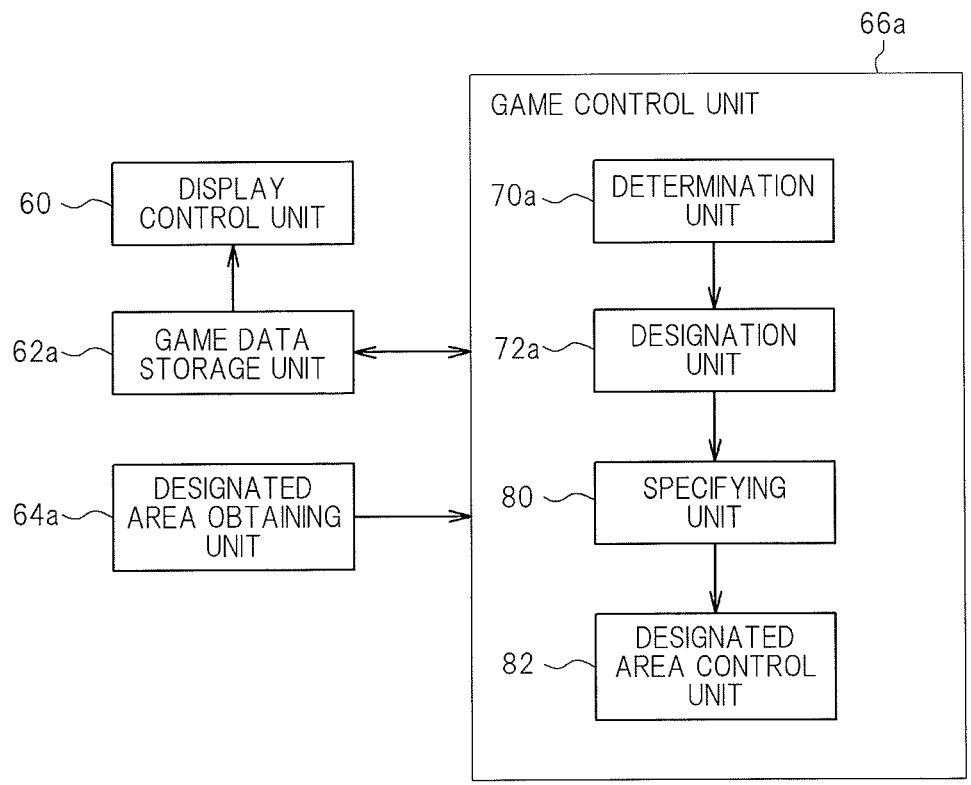
FIG. 15 is a functional block diagram showing functions realized in a game device according to a second embodiment.
FIG. 16 is a diagram showing one example of a parameter condition table.

FIG. 15 is a functional block diagram showing functions realized in the game device 10. As shown in FIG. 15, in the game device 10 according to the second embodiment, a display control unit 60, a game data storage unit 62a, a designated area obtaining unit 64a, and a game control unit 66a are realized. These functions are realized by the microprocessor 13 operating according to a program read from the optical disk 32. Note that the function of the display control unit 60 is identical to that in the first embodiment, with description thereof not repeated here.

[2-1-1. Game Data Storage Unit]

In the second embodiment as well, the game data storage unit 62a stores game situation data, a parameter table, and a parameter condition table, similar to the game data storage unit 62 in the first embodiment. As the parameter condition table is different from that in the first embodiment, the parameter condition table will be described below.

FIG. 16 shows one example of the parameter condition table in the second embodiment. The parameter condition table shown is data correlating a parameter condition concerning a cooperation parameter C and size data for controlling the size of the designated area 53. That is, in the parameter condition table in the second embodiment, size data for controlling the size of the designated area 53 is stored, instead of the size data for controlling the size of a determination area 51 (see FIG. 11).

As size data for controlling the size of the designated area 53, the value of the radius Rc of the designated area 53 is stored. The parameter condition table is defined such that a larger value of a cooperation parameter C results in a larger value of the radius Rc.

Further, the game data storage unit 62a in the second embodiment stores designated area data concerning the current size of the designated area 53 in addition to the game situation data, parameter table, and parameter condition table. Note that the size of the designated area 53 refers to the size of the area of the designated area 53 when the designated area 53 is a two dimensional area and the size of the volume of the designated area 53 when the designated area 53 is a three dimensional area. In this embodiment, in which the designated area 53 is a circular area, the designated area data is data indicating the current value of the radius Rc of the designated area 53. Note that, for example, for a rectangular designated area 53, designated area data is data describing the length of each side of the designated area 53 (rectangular area). At the beginning of a game, a predetermined initial value is set in the designated area data, and the size (radius Rc) of the designated area 53 is set to the predetermined initial value.

[2-1-2. Designated Area Obtaining Unit]

The designated area obtaining unit 64a (designated area obtaining means) is realized mainly using the microprocessor 13, the controller interface 20, and the operation input unit 21. The designated area obtaining unit 64a obtains an area designated by a user in a game screen image. In this embodiment, the designated area obtaining unit 64a obtains the designated area 53. The designated area 53 is an area coincident with the area where the cursor 52 is displayed. Details of an operation of the designated area obtaining unit 64a will be described later (see S301 in FIG. 17).

[2-1-3. Game Control Unit]

The game control unit 66a in the second embodiment includes a determination unit 70a, a designation unit 72a, a specifying unit 80, and a designated area control unit 82.

[Determination Unit]

The determination unit 70a determines whether or not the designated area 53 obtained by the designated area obtaining unit 64a is included in the determination area 51 for any player object (selected image candidate). Details of operation of the determination unit 70a will be described later (see S303 in FIG. 17).

[Designation Unit]

When it is determined that the designated area 53 obtained by the designated area obtaining unit 64a is included in the determination area 51 for any player object 44 (selected image candidate), the designation unit 72a designates the player object 44 (selected image candidate) as a selected player object (selected image). Details of operation of the designation unit 72a will be described later (see S304 in FIG. 17).

[Specifying Unit]

When any of the player objects 44 (selected image candidate) belonging to the operating team is designated by the designation unit 72a as a selected player object (selected image), the specifying unit 80 specifies a player object 44 (selected image candidate) located closest to the designated area 53 among the other player objects 44 (selected image candidate) belonging to the operating team. Details of operation of the specifying unit 80 will be described later (see S401 in FIG. 18).

[Designated Area Control Unit]

The designated area control unit 82 changes the size of the designated area 53, based on a parameter stored in the parameter table so as to be correlated to a combination of a player object 44 (selected image candidate) designated as a selected player object (selected image) and a player object 44 (selected image candidate) specified by the specifying unit 80. Details of an operation of the designated area control unit 82 will be described later (see S402 in FIG. 18).

[2-2. Process to be Carried Out in Game Device]

Figure 17:
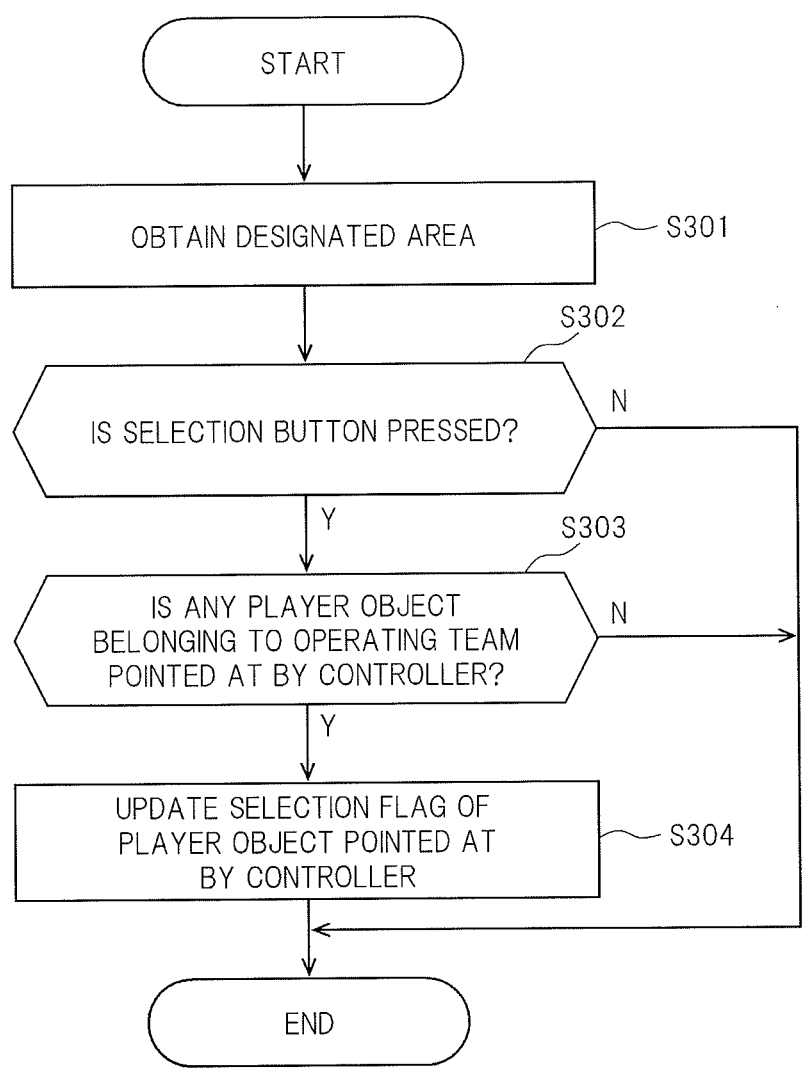
FIG. 17 is a flowchart showing one example of a process to be carried out in the game device.
Figure 18:
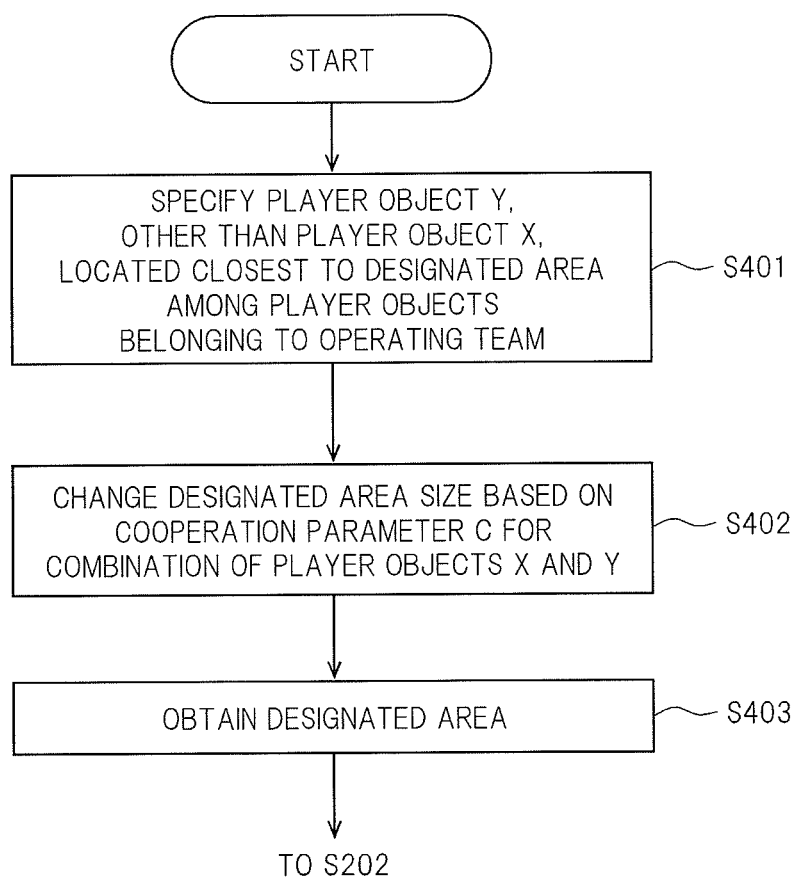
FIG. 18 is a flowchart showing one example of a process to be carried out in the game device.

FIGS. 17 and 18 show a flowchart of one example of a process to be carried out in a game device 10 according to the second embodiment. The process shown in FIGS. 17 and 18 is carried out by the microprocessor 13 operating according to a program.

Initially, the process shown in FIG. 17 will be described. The process shown in FIG. 17 corresponds to the process shown in FIG. 13 in the first embodiment. That is, the process shown in FIG. 17 is carried out when the values of the selection flags of all player objects 44 belonging to the operating team are "0". That is, the process shown in FIG. 17 is carried out every constant period when no player object 44 belonging to the operating team is selected as an operation target.

Specifically, the microprocessor 13 obtains the designated area 53 (S301). At S301, the microprocessor 13 obtains a position P pointed at by the front end portion 22a of the controller 22 in a game screen image, based on an operation signal supplied from the controller 22. Thereafter, the microprocessor 13 obtains the radius Rc of the current designated area 53, while referring to the designated area data. Note that in the above, the size (radius Rc) of the designated area 53 is set to a predetermined initial value. The microprocessor 13 obtains as a designated area 53 a circular area having the radius Rc and the position P as the center.

Thereafter, the microprocessor 13 determines, based on an operation signal supplied from the controller 22, whether or not a selection button has been pressed (S302). With the selection button not being pressed (N at S302), the microprocessor 13 terminates the process.

Meanwhile, With the selection button pressed (Y at S302), the microprocessor 13 determines whether or not any player object 44 belonging to the operating team is pointed at by the front end portion 22a of the controller 22 (S303). The process at this step is similar to that at S103 in FIG. 13.

When no player object 44 belonging to the operating team is pointed at by the front end portion 22a of the controller 22 (N at S303), the microprocessor 13 terminates the process. Meanwhile, when any of the player objects 44 belonging to the operating team is pointed at by the front end portion 22a of the controller 22 (Y at S303), the microprocessor 13 (designation means) sets the value of the selection flag of the player object 44 pointed at by the front end portion 22a of the controller 22 to "1" (S304). The process at this step is similar to that at S104 in FIG. 13.

In the following, the process shown in FIG. 18 will be described. The process shown in FIG. 18 corresponds to the process shown in FIG. 14 in the first embodiment. That is, the process shown in FIG. 18 is carried out when the value of the selection flag of any of the player objects 44 belonging to the operating team is set to "1". That is, the process shown in FIG. 18 is carried out every constant period when any of the player objects 44 belonging to the operating team is selected as an operation target. Note that a player object 44 having a selection flag with the value "1", that is, a player object 44 selected as an operation target, is hereinafter referred to as a "player object X".

That is, the microprocessor 13 specifies a player object 44, other than the player object X, located closest to the designated area 53 among the player objects 44 belonging to the operating team (S401). That is, the microprocessor 13 (specifying means) specifies a player object 44 located closest to the designated area 53 among the player objects 44 belonging to the operating team and having a selection flag set to the value "0".

At S401, for each of the player objects 44 having a selection flag set to the value "0", the microprocessor 13 obtains the distance between the central point of the designated area 53 (that is, the position P pointed at by the front end portion 22a of the controller 22 in a game screen image) and the display position of the player object 44. Note that the "display position of a player object 44" is obtained by transforming the world coordinate values (coordinate values in the XW-YW-ZW coordinate system shown in FIG. 4) of the representative position of a player object 44 to screen coordinate values through a predetermined coordinate transformation operation. Then, a player object 44 located closest to the designated area 53 among the player objects 44 having a selection flag set to the value "0" is specified. Note that the player object 44 specified at S401 is hereinafter referred to as a "player object Y".

Then, the microprocessor 13 (designated area control means) changes the size of the designated area 53 (S402).

That is, the microprocessor 13 obtains, from the parameter table, the cooperation parameter C correlated to the combination of the player object X and the player object Y. Thereafter, with reference to the parameter condition table, the microprocessor 13 specifies a parameter condition satisfied by the obtained cooperation parameter C, and then updates the designated area data (the value of the radius Rc of the designated area 53), based on the size data correlated to the parameter condition.

Further, the microprocessor 13 obtains the designated area 53 similarly to S301 in FIG. 17 (S403). With the designated area 53 obtained, the microprocessor 13 carries out the process at S202 to S208 shown in FIG. 14, similar to the first embodiment. However, in the second embodiment, the size of the designated area 53 is initialized at S208, instead of the size of a determination area 51. That is, the designated area data is initialized, and the radius Rc of the designated area 53 is set to a predetermined initial value.

[2-3. Conclusion of Second Embodiment]

In the game device 10 according to the above described second embodiment, when, for example, a player object 44 is selected as a pass receiver to receive a pass from the player object 44 holding the ball object 42, the size of the designated area 53 is changed depending on the combination of the player object 44 holding the ball object 42 and a player object 44 which is a candidate for a pass receiver.

For example, when a cooperation parameter C corresponding to a combination of the player object 44 holding the ball object 42 and a player object 44 which is a candidate for a pass receiver has a higher value, a larger designated area 53 results. In this case, a user can more readily select the player object 44 as a pass receiver. Meanwhile, when a cooperation parameter C corresponding to a combination of the player object 44 holding the ball object 42 and a player object 44 which is a candidate for a pass receiver has a lower value, a smaller designated area 53 results. In this case, a user can less readily select the player object 44 as a pass receiver.

As described above, in the game device 10 according to the second embodiment, ease in selection of a pass receiver is changed depending on a combination of the player object 44 holding the ball object 42 and a player object 44 which is a candidate for a pass receiver. According to the game device 10 in the second embodiment, it is possible to allow a user to experience a real feeling of the relationship (e.g., chemistry or smoothness in cooperation) between the player object 44 holding the ball object 42 and a player object 44 which is a candidate for a pass receiver.

3. Modified Example

Note that an embodiment of the present invention is not limited to the above-described first and second embodiments.

3-1. First Modified Example

For example, the first and second embodiments may be combined. That is, the size of the determination area 51 and that of the designated area 53 may both be changed.

Figures 19, 20:
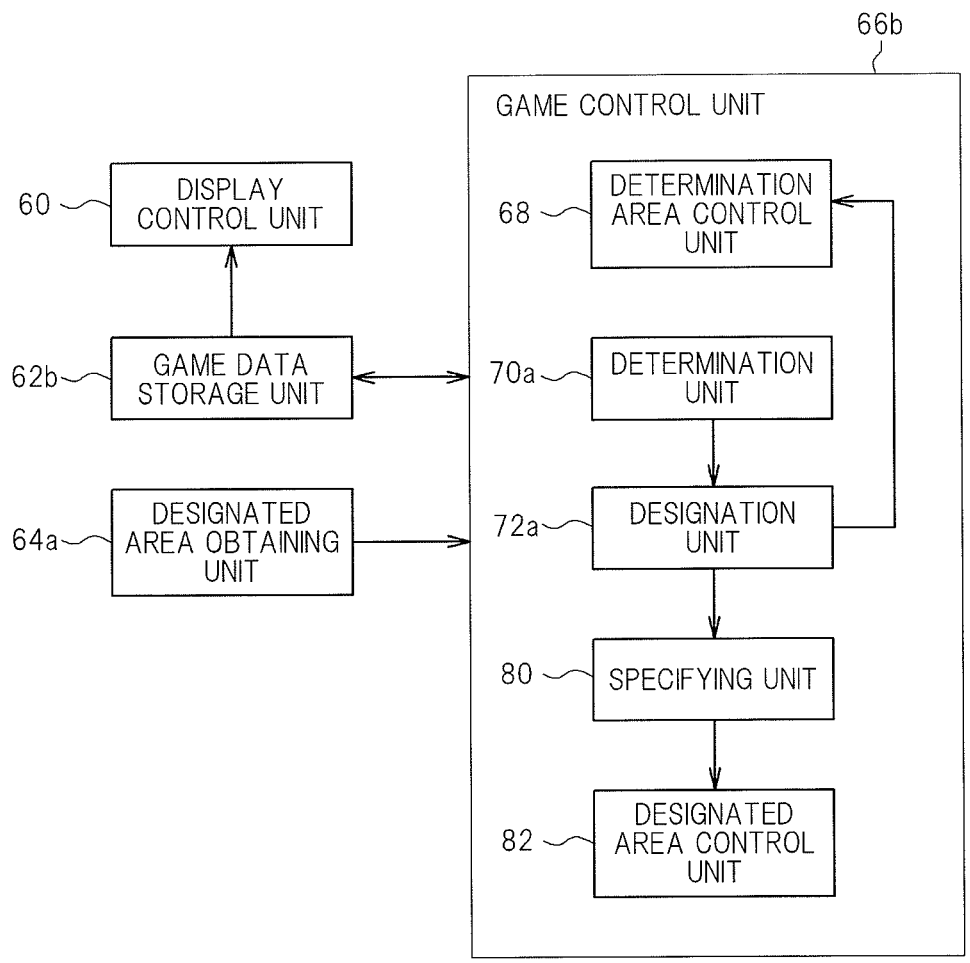
FIG. 19 is a functional block diagram showing a game device according to a third embodiment.
FIG. 20 is a diagram showing one example of a parameter condition table.

FIG. 19 is a functional block diagram showing functions realized in a game device 10 according to this modified example. As shown in FIG. 19, in the game device 10 in this case, a display control unit 60, a game data storage unit 62b, a designated area obtaining unit 64a, and a game control unit 66b are realized. Note that the display control unit 60 is similar to that in the first and second embodiments, and the designated area obtaining unit 64*a* is similar to that in the second embodiment, with detailed description thereof not repeated here.

The game data storage unit 62*b* stores the data to be stored in the game data storage unit 62 (see FIG. 8) and the game data storage unit 62*a* (see FIG. 15). For example, both of the parameter condition table shown in FIG. 12 and the parameter condition table shown in FIG. 16 are stored in the game data storage unit 62*b*.

The game control unit 66*b* includes a determination area control unit 68, a determination unit 70*a*, a designation unit 72*a*, a specifying unit 80, and a designated area control unit 82. Note that the determination area control unit 68 is similar to that in the first embodiment, and the determination unit 70*a*, designation unit 72*a*, specifying unit 80, and designated area control unit 82 are similar to those in the second embodiment.

A process to be carried out in the game device 10 in the modified example will be described.

In the game device 10 in this modified example, the process shown in FIG. 13 is carried out when the values of the selection flags of all player objects 44 belonging to the operating team are set to "0". In this case, a process similar to that at S301 in FIG. 17 is carried out at S101. That is, the microprocessor 13 obtains the designated area 53 at S101, based on an operation signal supplied from the controller 22 and the designated area data stored in the game data storage unit 62*b*.

Further, in the game device 10 in this modified example, the process shown in FIG. 18 is carried out when the value of the selection flag of any player object 44 belonging to the operating team is set to "1". In this case, however, both the size of the determination area 51 and the size of the designated area 53 are initialized at S208.

3-2. Second Modified Example

For example, when any of the player objects 44 belonging to the operating team is selected as an operation target in the first embodiment or the first modified example, the microprocessor 13 (determination area control means, first change means) may change the size of the determination area 51 for another player object 44, depending on the period of time elapsed after a reference time.

In this case, based on a cooperation parameter C stored in the parameter table so as to be correlated to a combination of a player object 44 selected as an operation target and another player object 44, the microprocessor 13 may control the manner in which to change the size of the determination area 51 for the other player object 44.

In the second modified example, the parameter condition table shown in FIG. 20 is read from the optical disk 32. The parameter condition table shown in the diagram is data correlating a parameter condition, or a condition concerning a cooperation parameter C, and data for controlling change in size (radius Rj) of a determination area 51. Note that RJ1 to RJ5 in FIG. 20 refer to the initial size of a determination area 51, and ΔRJ1 to ΔRJ5 refer to an amount of change in size of a determination area 51, that is, the expanding speed of a determination area 51, per unit period.

The parameter condition table shown in FIG. 20 is defined such that a larger value of a cooperation parameter C results in a larger initial size RJ1 to RJ5 of a determination area 51 and also a faster expanding speed ΔRJ1 to ΔRJ5 of a determination area 51. That is, the parameter condition table is defined such that the manner (an expanding speed) of changing the size of a determination area 51 is changed based on the value of a cooperation parameter C.

In the following, a process to be carried out in the game device 10 in the second modified example will be described. The description below is based on the assumption that a time at which any of the player objects 44 belonging to the operating team is selected as an operation target is determined as a reference time.

When none of the player objects 44 belonging to the operating team is selected as an operation target, the microprocessor 13 carries out the process shown in FIG. 13 in the second modified example as well.

However, in the second modified example, the microprocessor 13 changes the size of a determination area 51 at S105 as described below.

The process at S105 in the second modified example will be described, while referring to a case as an example in which, for example, the player object X is selected as an operation target and the size of the determination area 51 for the player object Y is changed.

In this case, the microprocessor 13 obtains the cooperation parameter C correlated to the combination of the player object X and the player object Y from the parameter table. Thereafter, the microprocessor 13 specifies a parameter condition satisfied by the obtained cooperation parameter C, while referring to the parameter condition table, and then updates the value of the radius Rj to be stored in the determination area field (see FIG. 9) of the player object Y, based on the size data correlated to the parameter condition and the elapsed period of time T (T=0 in this case).

When any of the player objects 44 belonging to the operating team is selected as an operation target, the microprocessor 13 carries out the process shown in FIG. 14 in the second modified example as well.

In the second modified example, however, a period of time T elapsed after selection of any player object 44 as an operation target is stored in the main memory 14. In addition, the microprocessor 13 carries out a process similar to that at S105 before S201. With the process at S105 carried out before S201, the size of the determination area 51 for another player object 44 belonging to the operating team is changed in the manner (expanding speed) determined based on the cooperation parameter C correlated to the combination of the player object 44 selected as an operation target and the other player object 44.

According to the second modified example, when the player object X belonging to the operating team is selected as an operation target, the expanding speed of the size of the determination area 51 for the player object Y belonging to the operating team is changed depending on the relationship (e.g., chemistry and/or smoothness in cooperation) between the player object X and the player object Y. As a result, ease in selection of the player object Y is changed, depending on the relationship between the player object X and the player object Y. That is, according to the second modified example as well, it is possible to allow a user to experience a real feeling of the relationship (e.g., chemistry and/or smoothness in cooperation) between the player object X and the player object Y.

Note that in the parameter condition table shown in FIG. 20, the initial size RJ1 to RJ5 of a determination area 51 may be set to a constant value irrespective of the value of a cooperation parameter C.

In the parameter condition table shown in FIG. 20, the expanding speed ΔRJ1 to ΔRJ5 of a determination area 51 may be set to a constant value irrespective of the value of a cooperation parameter C. In this case, only the size (the initial size) of a determination area 51 before being changed depending on the elapsed period of time T is changed depending on the relationship (e.g., chemistry and/or smoothness in cooperation) between the player object X and the player object Y. In this manner as well, ease in selection of the player object Y is changed depending on the relationship (e.g., chemistry and/or smoothness in cooperation) between the player object X and the player object Y so that a user can experience a real feeling of the relationship between the player object X and the player object Y.

3-3. Third Modified Example

For example, the microprocessor 13 (designated area control means, second change means) may change the size of the designated area 53, depending on the period of time elapsed after a reference time when any of the player objects 44 belonging to the operating team is selected as an operation target in the second embodiment or the first modified example.

In this case, the microprocessor 13 may control the manner in which to change the size of the designated area 53, based on the cooperation parameter C stored in the parameter table so as to be correlated to a combination of a player object 44 selected as an operation target and another player object 44.

In the third modified example, the parameter condition table shown in FIG. 21 is read from the optical disk 32. The parameter condition table shown in the diagram is data correlating a parameter condition which is a condition concerning a cooperation parameter C and size data for controlling change in size (radius Rc) of the designated area 53. Note that in FIG. 21, RC1 to RC5 indicate the initial size of the designated area 53, and ΔRC1 to ΔRC5 indicate an amount of change in size of the designated area 53, that is, the expanding speed of the designated area 53, per unit period.

The parameter condition table shown in FIG. 21 is defined such that a larger value of a cooperation parameter C results in a larger initial size RC1 to RC5 of the designated area 53 and also a faster expanding speed ΔRC1 to ΔRC5 of the designated area 53. That is, the parameter condition table is defined such that the manner (expanding speed) of changing the size of the designated area 53 is changed based on the value of a cooperation parameter C.

Below, a process to be carried out in a game device 10 in the third modified example will be described. The below description is given based on the assumption that a time at which any of the player objects 44 belonging to the operating team is selected as an operation target is defined as a reference time.

With none of the player objects 44 belonging to the operating team being selected as an operation target, the microprocessor 13 carries out the process shown in FIG. 13 or 17 in the third modified example as well.

Meanwhile, with any of the player objects 44 belonging to the operating team being selected as an operation target, the microprocessor 13 carries out the process shown in FIG. 18 in the third modified example as well.

In the third modified example, however, the period of time T elapsed after selection of any player object 44 as an operation target is stored in the main memory 14. Further, the microprocessor 13 changes the size of the designated area 53 at S402 as described below.

For example, while referring to an example in which the player object X is selected as an operation target and the player object Y is specified at S401, the process at S402 in the third modified example will be described.

In this case, the microprocessor 13 initially obtains the cooperation parameter C correlated to the combination of the player object X and the player object Y from the parameter table. Thereafter, the microprocessor 13 specifies a parameter condition satisfied by the obtained cooperation parameter C, while referring to the parameter condition table, and then updates the designated area data (the value of the radius Rc of the designated area 53), based on the size data correlated to the parameter condition and the elapsed period of time T.

With the process at S402 carried out, the size of the designated area 53 is changed in the manner (expanding speed) based on the combination of the player object 44 selected as an operation target and another player object 44 belonging to the operating team.

According to the third modified example, when the player object X belonging to the operating team is selected as an operation target, the expanding speed of the size of the designated area 53 is changed depending on the relationship (e.g., chemistry and/or smoothness in cooperation) between the player object X and the player object Y. As a result, ease in selection of the player object Y is changed depending on the relationship between the player object X and the player object Y. In the third modified example as well, it is possible to allow a user to experience a real feeling of the relationship (e.g., chemistry and/or smoothness in cooperation) between the player object X and the player object Y.

Note that in the parameter condition table shown in FIG. 21, the initial size RC1 to RC5 of the designated area 53 may be set to a constant value irrespective of the value of a cooperation parameter C.

Further, in the parameter condition table shown in FIG. 21, the expanding speed ΔRC1 to ΔRC5 of the designated area 53 may be set to a constant value irrespective of the value of a cooperation parameter C. In this case, only the size (initial size) of the designated area 53 before being changed depending on the elapsed period of time T is changed depending on the relationship (e.g., chemistry and/or smoothness in cooperation) between the player object X and the player object Y. In this manner as well, ease in selection of the player object Y is changed depending on the relationship (e.g., chemistry and/or smoothness in cooperation) between the player object X and the player object Y, so that a user can experience a real feeling of the relationship between the player object X and the player object Y.

4. Others (A) The size of the determination area 51 for a player object 44 may be changed based on, for example, the moving direction and/or moving speed of the player object 44.

For example, the determination area 51 for a player object 44 may be expanded in the moving direction of the player object 44. Note that in this case, the degree of expansion of the determination area 51 for a player object 44 may be controlled based on the moving speed of the player object 44. That is, it may be arranged such that a faster moving speed of a player object 44 results in a larger degree of expansion of the determination area 51.

Further, the determination area 51 for a player object 44 may be enlarged based on, for example, the moving speed of the player object 44. More specifically, the degree of enlargement of the determination area 51 for a player object 44 may be controlled based on the moving speed of the player object 44. That is, it may be arranged such that a faster moving speed of a player object 44 results in a larger degree of enlargement of the determination area 51.

(B) When, for example, the operating team is attacking (that is, a player object 44 belonging to the operating team 4 holds the ball object 42), the determination area control unit 68 may change the size of the determination area 51 for only a player object 44 located closer to the goal object 40 correlated to the opponent team than the player object 44 selected as an operation target.

Further, when, for example, the operating team is defending (that is, a player object 44 belonging to the opponent team holds the ball object 42), the determination area control unit 68 may change the size of the determination area 51 for only a player object 44 located closer to the goal object 40 correlated to the operating team than the player object 44 selected as an operation target.

(C) For example, an interface on which a user designates a position in a game screen image is not limited to the above described interface. For example, the microprocessor 13 may move the cursor 52 in the direction designated by a user, using the direction button 36. In this case, the designated position obtaining unit 64 and the designated area obtaining unit 64a use the central position of the cursor 52, instead of a position P pointed at by the front end portion 22a of the controller 22.

(D) For example, an interface on which a user designates a position in a game screen image may be a touch panel provided on the monitor 30 (e.g., a liquid crystal monitor). In this case, the designated position obtaining unit 64 and the designated area obtaining unit 64a may use a position pressed by a user in a game screen image, instead of a position P pointed at by the front end portion 22a of the controller 22.

(E) Although a case in which the present invention is applied to a case in which for example, a soccer game is provided in the game device 10 is described in the above, the present invention may be applied to a case in which a sport game other than a soccer game is applied.

Further, the present invention is applicable to a case in which a game other than a sport game is provided in the game device 10. For example, the present invention is applicable to a case in which an action game with a plurality of characters (selected image candidates) shown in a game screen image is provided in the game device 10. For example, the present invention is applicable to a case in which a first character casts a spell on a second character when a user selects the first character as an operation target, and then points the front end portion 22a of the controller 22 at the second character, to thereby select the second character.

The invention claimed is:

1. A game device, comprising:
   display control means for displaying a plurality of selected image candidates on display means;
   parameter storage means for storing a parameter so as to be correlated to a combination of the selected image candidates;
   designated area obtaining means for obtaining a designated area designated by a user;
   determination means for determining whether or not the designated area obtained by the designated area obtaining means is included in a determination area for the selected image candidate;
   designation means for designating a selected image candidate corresponding to the determination area as a selected image when the designated area obtained by the designated area obtaining means is included in the determination area;
   determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate;
   specifying means for specifying, when any of the plurality of selected image candidates is designated as the selected image by the designation means, a selected image candidate located closest to the designated area among other selected image candidates of the plurality of selected image candidates; and
   designated area control means for changing a size of the designated area, based on a parameter stored so as to be correlated to a combination of the selected image candidate designated as the selected image and the selected image candidate specified by the specifying means.

2. A game device, comprising:
   display control means for displaying a plurality of selected image candidates on display means;
   parameter storage means for storing a parameter so as to be correlated to a combination of the selected image candidates;
   designated position obtaining means for obtaining a position designated by a user;
   determination means for determining whether or not the position obtained by the designated position obtaining means is included in a determination area for the selected image candidate;
   designation means for designating, when the position obtained by the designated position obtaining means is included in the determination area, a selected image candidate corresponding to the determination area as a selected image; and
   determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate.

3. A game device, comprising:
   display control means for displaying a plurality of selected image candidates on display means;
   parameter storage means for storing a parameter so as to be correlated to a combination of the selected image candidates;
   designated area obtaining means for obtaining a designated area designated by a user;
   determination means for determining whether or not the designated area obtained by the designated area obtaining means is included in a determination area for the selected image candidate;
   designation means for designating a selected image candidate corresponding to the determination area as a selected image when the designated area obtained by the designated area obtaining means is included in the determination area;
   specifying means for specifying a selected image candidate located closest to the designated area, when any of the plurality of selected image candidates is designated as the selected image by the designation means, among other selected image candidates of the plurality of selected image candidates, and
   designated area control means for changing a size of the designated area, based on a parameter stored so as to be correlated to a combination of the selected image candidate designated as the selected image and the selected image candidate specified by the specifying means.

4. The game device according to claim 1, wherein
the determination area control means includes
first change means for changing a size of a determination area for another selected image candidate, depending on a period of time elapsed after a reference time, and
means for controlling the size of the determination area for the other selected image candidate before being changed by the first change means, or controlling a manner in which the first change means changes the size of the determination area for the other selected image candidate, based on a parameter stored so as to be correlated to a combination of the selected image candidate designated as the selected image and the other selected image candidate, and
the designated area control means includes
second change means for changing a size of the designated area, depending on the period of time elapsed after the reference time, and
means for controlling the size of the designated area before being changed by the second change means, or controlling a manner in which the second change means changes the size of the designated area, based on a parameter stored so as to be correlated to a combination of the selected image candidate designated as the selected image and the selected image candidate specified by the specifying means.

5. A control method for a game device having a processor, parameter storage and a display, comprising:
a display control step of displaying a plurality of selected image candidates on the display;
a step under control of the processor of reading content stored in the parameter storage for storing a parameter so as to be correlated to a combination of the selected image candidates;
a designated area obtaining step of obtaining under control of the processor a designated area designated by a user;
a determination step of determining under control of the processor whether or not the designated area obtained at the designated area obtaining step is included in a determination area for the selected image candidate;
a designation step of designating under control of the processor a selected image candidate corresponding to the determination area as a selected image when the designated area obtained at the designated area obtaining step is included in the determination area;
a determination area control step of changing under control of the processor, when any of the plurality of selected image candidates is designated as the selected image at the designation step, a size of a determination area for another selected image candidate among the plurality of selected image candidates, based on a parameter stored so as to be correlated to a combination of the selected image candidate designated as the selected image and the other selected image candidate;
a specifying step of specifying under control of the processor, when any of the plurality of selected image candidates is designated as the selected image at the designation step, a selected image candidate located closest to the designated area among the other selected image candidates in the plurality of selected image candidates; and
a designated area control step of changing under control of the processor a size of the designated area, based on a parameter stored so as to be correlated to a combination of the selected image candidate designated as the selected image and the selected image candidate specified at the specifying step.

6. A non-transitory computer readable information storage medium storing a program for causing a computer to function as:
display control means for displaying a plurality of selected image candidates on display means;
means for reading content stored in parameter storage means for storing a parameter so as to be correlated to a combination of the selected image candidates;
designated area obtaining means for obtaining a designated area designated by a user;
determination means for determining whether or not the designated area obtained by the designated area obtaining means is included in a determination area for the selected image candidate;
designation means for designating a selected image candidate corresponding to the determination area as a selected image when the designated area obtained by the designated area obtaining means is included in the determination area;
determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate;
specifying means for specifying, when any of the plurality of selected image candidates is designated as the selected image by the designation means, a selected image candidate located closest to the designated area among the other selected image candidates in the plurality of selected image candidates; and
designated area control means for changing a size of the designated area, based on a parameter stored so as to be correlated to a combination of the selected image candidate designated as the selected image and the selected image candidate specified by the specifying means.

7. A control method for a game device having a processor, parameter storage and a display, comprising:
a display control step of displaying a plurality of selected image candidates on the display;
a step under control of the processor of reading content stored in the parameter storage for storing a parameter so as to be correlated to a combination of the selected image candidates;
designated position obtaining step of obtaining a under control of the processor a position designated by a user;
determination step of determining under control of the processor whether or not the position obtained at the designated position obtaining step is included in a determination area for the selected image candidate;
designation step of designating under control of the processor, when the position obtained at the designated position obtaining step is included in the determination area, a selected image candidate corresponding to the determination area as a selected image; and
determination area control step of changing under control of the processor, when any of the plurality of selected image candidates is designated as the selected image at the designation step, a size of a determination area for another selected image candidate among the plurality of selected image candidates, based on a parameter stored so as to be correlated to a combination of the selected image candidate designated as the selected image and the other selected image candidate.

8. A non-transitory computer readable information storage medium storing a program for causing a computer to function as:
- a display control means for displaying a plurality of selected image candidates on display means;
- means for reading content stored in parameter storage means for storing a parameter so as to be correlated to a combination of the selected image candidates;
- designated position obtaining means for obtaining a position designated by a user;
- determination means for determining whether or not the position obtained by the designated position obtaining means is included in a determination area for the selected image candidate;
- designation means for designating, when the position obtained by the designated position obtaining means is included in the determination area, a selected image candidate corresponding to the determination area as a selected image; and
- determination area control means for changing, when any of the plurality of selected image candidates is designated as the selected image by the designation means, a size of a determination area for another selected image candidate among the plurality of selected image candidates, based on a parameter stored so as to be correlated to a combination of the selected image candidate designated as the selected image and the other selected image candidate.

9. A control method for a game device having a processor, parameter storage and a display, comprising:
- display control step of displaying a plurality of selected image candidates the display;
- a step under control of the processor of reading content stored in the parameter storage for storing a parameter so as to be correlated to a combination of the selected image candidates;
- designated area obtaining step of obtaining under control of the processor a designated area designated by a user;
- determination step of determining under control of the processor whether or not the designated area obtained at the designated area obtaining step is included in a determination area for the selected image candidate;
- designation step of designating under control of the processor a selected image candidate corresponding to the determination area as a selected image when the designated area obtained at the designated area obtaining step is included in the determination area;
- specifying step of specifying under control of the processor a selected image candidate located closest to the designated area, when any of the plurality of selected image candidates is designated as the selected image at the designation step, among other selected image candidates of the plurality of selected image candidates, and
- designated area control step of changing under control of the processor a size of the designated area, based on a parameter stored so as to be correlated to a combination of the selected image candidate designated as the selected image and the selected image candidate specified at the specifying step.

10. A non-transitory computer readable information storage medium storing a program for causing a computer to function as:
- display control means for displaying a plurality of selected image candidates on display means;
- means for reading content stored in parameter storage means for storing a parameter so as to be correlated to a combination of the selected image candidates;
- designated area obtaining means for obtaining a designated area designated by a user;
- determination means for determining whether or not the designated area obtained by the designated area obtaining means is included in a determination area for the selected image candidate;
- designation means for designating a selected image candidate corresponding to the determination area as a selected image when the designated area obtained by the designated area obtaining means is included in the determination area;
- specifying means for specifying a selected image candidate located closest to the designated area, when any of the plurality of selected image candidates is designated as the selected image by the designation means, among other selected image candidates of the plurality of selected image candidates, and
- designated area control means for changing a size of the designated area, based on a parameter stored so as to be correlated to a combination of the selected image candidate designated as the selected image and the selected image candidate specified by the specifying means.

* * * * *